(12) United States Patent
Burgess et al.

(10) Patent No.: US 12,161,933 B2
(45) Date of Patent: *Dec. 10, 2024

(54) GAMES CONTROLLER

(71) Applicant: Ironburg Inventions Limited, Loughborough (GB)

(72) Inventors: Simon Burgess, Cossington (GB); Duncan Ironmonger, Milton, GA (US)

(73) Assignee: Ironburg Inventions Limited, Wincanton (GB)

( * ) Notice: Subject to any disclaimer, the term of this patent is extended or adjusted under 35 U.S.C. 154(b) by 107 days.

This patent is subject to a terminal disclaimer.

(21) Appl. No.: 18/051,971

(22) Filed: Nov. 2, 2022

(65) Prior Publication Data

US 2023/0285849 A1  Sep. 14, 2023

Related U.S. Application Data

(63) Continuation of application No. 17/084,788, filed on Oct. 30, 2020, now Pat. No. 11,504,611, which is a continuation of application No. 14/953,121, filed on Nov. 27, 2015, now Pat. No. 10,870,051, which is a continuation of application No. PCT/EP2015/060525, filed on May 12, 2015.

(60) Provisional application No. 61/991,843, filed on May 12, 2014.

(51) Int. Cl.
*A63F 13/24* (2014.01)
*A63F 13/98* (2014.01)

(52) U.S. Cl.
CPC .............. *A63F 13/24* (2014.09); *A63F 13/98* (2014.09)

(58) Field of Classification Search
None
See application file for complete search history.

(56) References Cited

U.S. PATENT DOCUMENTS

| 11,504,611 B2* | 11/2022 | Burgess | A63F 13/24 |
| 2012/0322553 A1* | 12/2012 | Burgess | A63F 13/20 463/37 |
| 2014/0113723 A1* | 4/2014 | Burgess | A63F 13/21 463/37 |

* cited by examiner

*Primary Examiner* — Damon J Pierce
(74) *Attorney, Agent, or Firm* — Walters & Wasylyna LLC

(57) ABSTRACT

The invention provides an improved controller (10) for a games console. The invention is a games controller (10) that is intended to be held by a user in both hands in the same manner as a conventional controller (1). Additionally, the controller of the invention (10) may comprise the same controls (2, 3, 4, 5, 6, 7, 8, 9) as a conventional controller (1). The controller of the present invention (10) is advantageous as it additionally comprises two additional controls (11A, 11B, 11C, 11D) located on the rear of the controller (10) in a position to be operated by the middle fingers of a user (12). The additional controllers (11A, 11B, 11C, 11D) may be paddle levers and may replicate the functions of one or more of the controls (2, 3, 4, 5, 6, 7, 8, 9) located on the front or top of the controller (10).

20 Claims, 21 Drawing Sheets

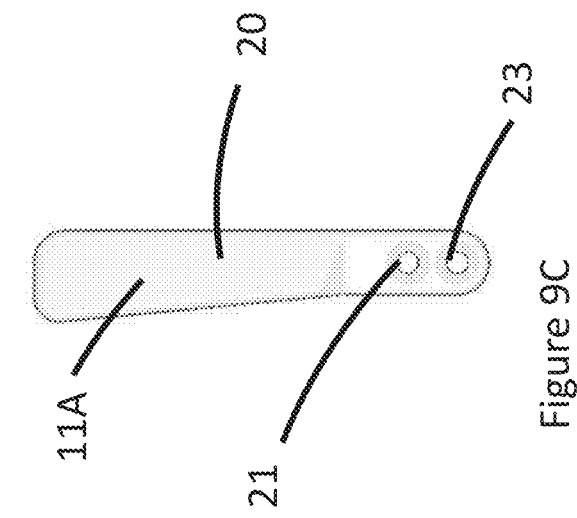
Figure 9C
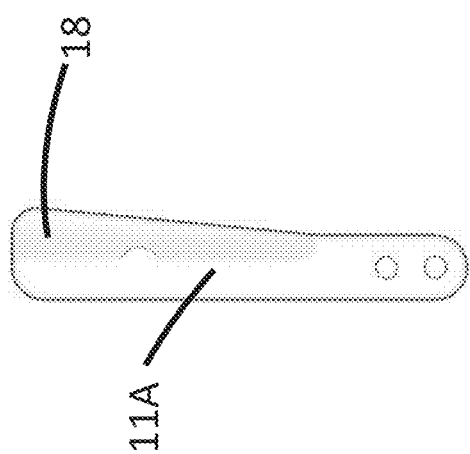
Figure 9B
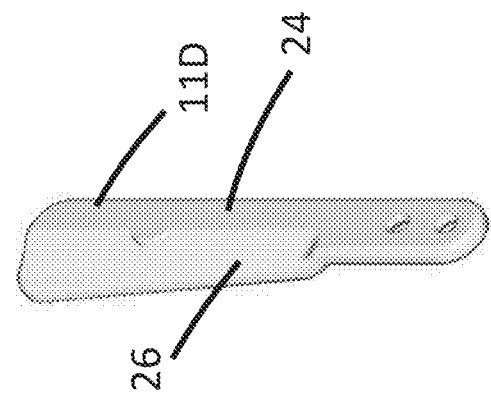
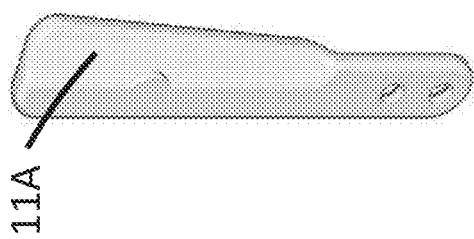
Figure 9A

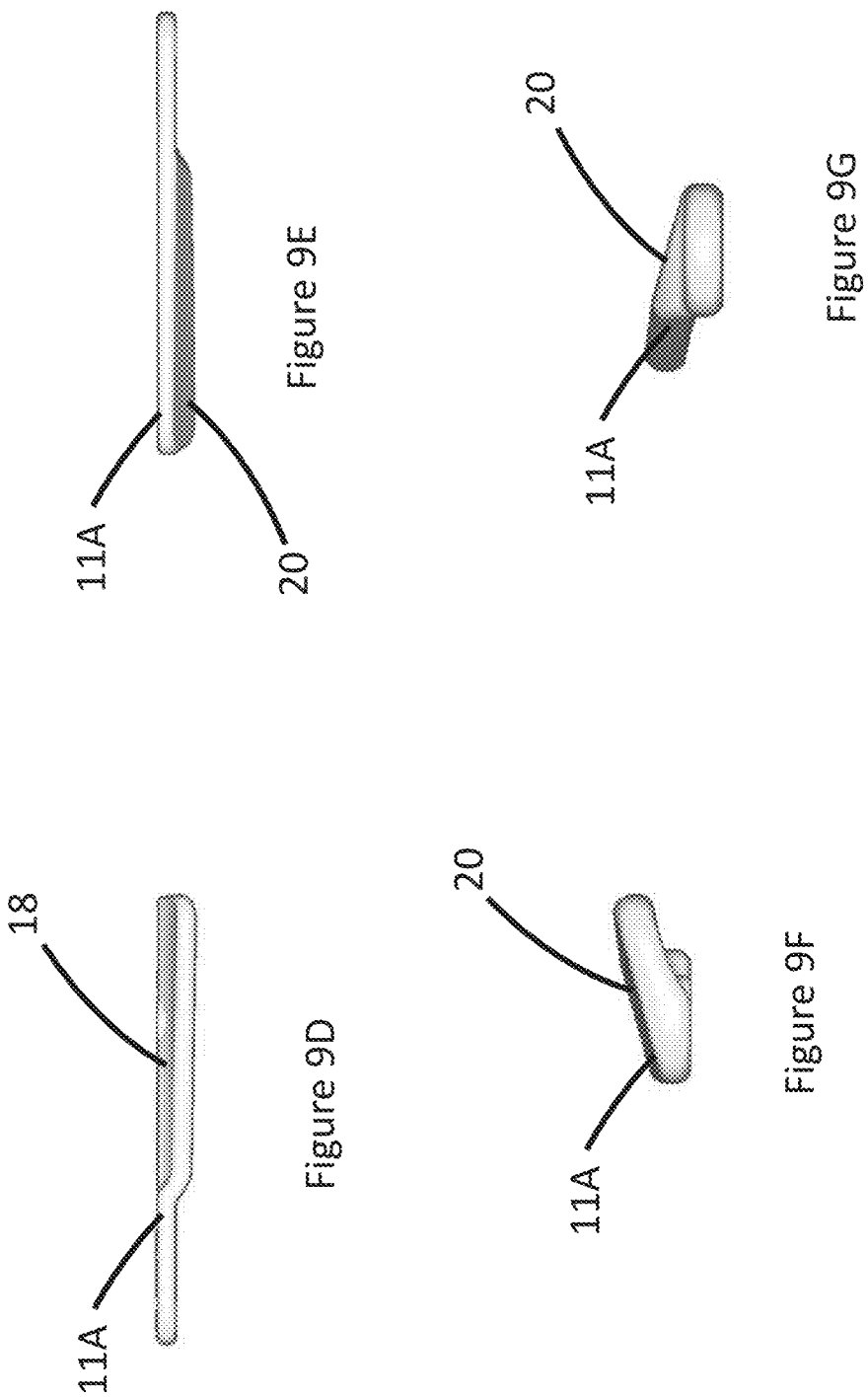

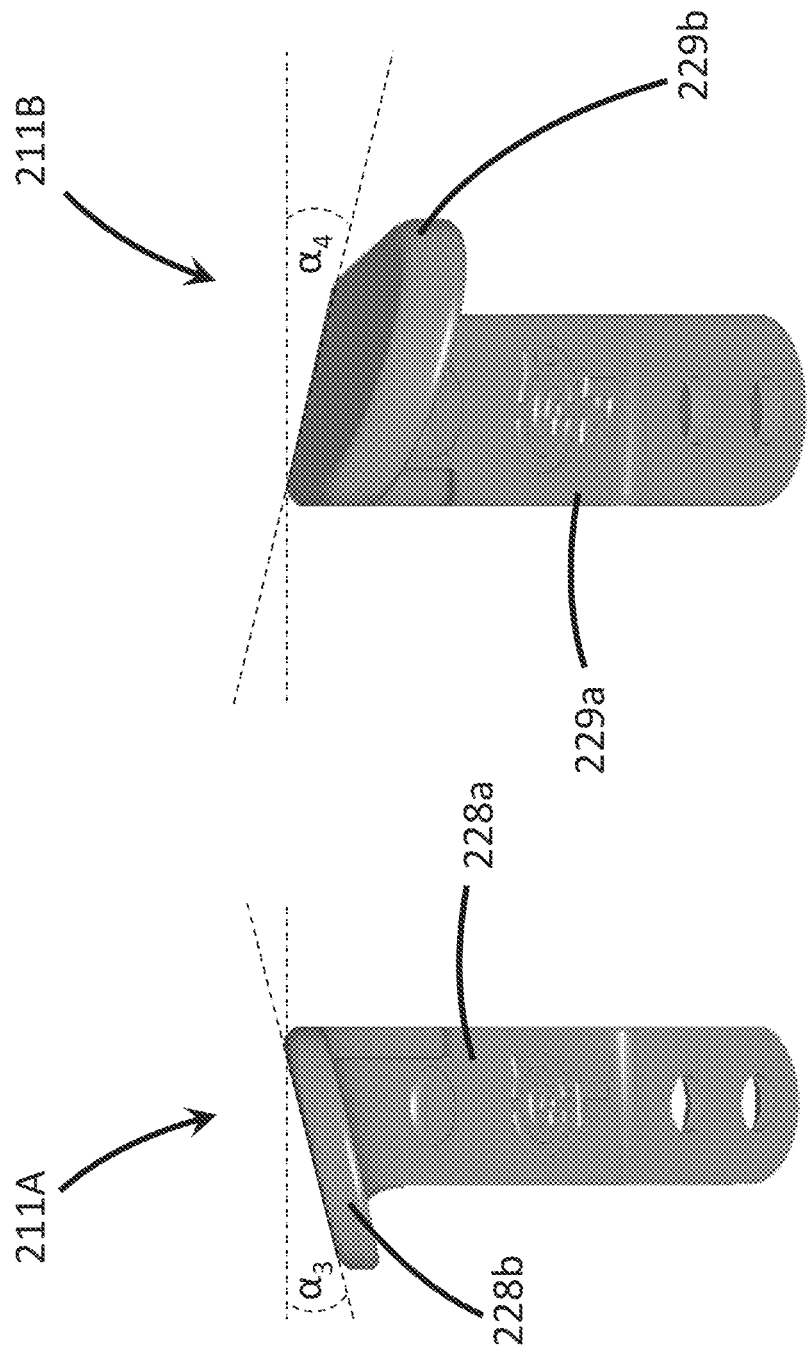

GAMES CONTROLLER

PRIORITY

This application is a continuation of U.S. Ser. No. 17/084,788 filed on Oct. 30, 2020, which is a continuation of U.S. Ser. No. 14/953,121 filed on Nov. 27, 2015, which is a continuation of Intl. App. No. PCT/EP2015/060525 filed on May 12, 2015, which claims priority from U.S. Ser. No. 61/991,843 filed on May 12, 2014. The entire contents of Ser. No. 17/084,788, 14/953,121, PCT/EP2015/060525, and 61/991,843 are incorporated herein by reference.

FIELD

The invention relates to controllers for controlling the play of computerized games; more particularly, but not exclusively, the invention relates to an actuator system of a game controller for a gaming console.

BACKGROUND

There are many different types of gaming consoles currently available for operating a video game. For example, Microsoft®, Sony® and Nintendo® manufacture the Xbox®, PlayStation® and Wii® gaming consoles, respectively. The gaming consoles typically include a game controller so that a user can control the operation of the video game.

Controllers for most current games consoles are generally intended to be held and operated by the user using both hands. A conventional controller will generally comprise a hard outer case with a plurality of controls mounted about the controller. Typically the controls include buttons, analogue control sticks, bumpers and triggers.

Some known game controllers include a form of actuator system for the operation of control of the functions of the video games. Actuators, buttons or other depressible or manually operable devices are typically used for controlling discrete actions such as the firing of a weapon or issuing an attack command. It is known to provide a button, actuator, or other controls, on the front and top of the controller. Controls mounted on the front of the controller are intended to be operable by the index fingers of a user; such buttons are commonly known as triggers or bumpers. Controls mounted on the top of the controller are intended to be operable by the thumbs of a user; such controls may include left and right analogue thumb sticks, which normally control movement and are intended to be operated by the user's left and right thumbs respectively. There may be additional buttons located on a front right portion of the top of the controller, which normally control additional actions and are intended to be operated by the user's right thumb. There may be provided a direction pad located on the rear left portion of the top of the controller. The direction pad is intended to be operated by the user's left thumb, typically either as an alternative to the left thumb stick or to provide additional actions. The controllers typically have a pair of handles or grip portions to enable a user to hold the controller; typically the user will employ the middle, ring and/or little finger of each hand to grasp a respective handle.

Due to the rapidly expanding gaming market and development of involved games invoking considerable player input, it is desirable for players to be able to customize their controllers in order to gain increased control in a variety of gaming circumstances.

The present invention seeks to improve upon, or at least mitigate, some of the problems associated with controllers of the prior art by providing a game controller which includes additional actuators on the bottom of the controller, which allow a user to employ the middle, ring or little finger of the hand for operation of control of the functions of a video game.

SUMMARY

A first aspect of the present invention provides an apparatus for supplying user inputs to a computer program, such as a game program, for controlling the game program, comprising:
 a case; and
 a plurality of controls located on a front end and top of the apparatus;
 the apparatus being shaped to be held in both hands of a user such that the user's thumbs are positioned to operate controls located on the top of the apparatus and the user's index fingers are positioned to operate controls located on the front end of the apparatus; wherein the apparatus further comprises at least one first additional control located on a base of the apparatus in a position operable by a middle, ring or little finger of a user, the at least one additional control comprising a first elongate member which is displaceable by a user to activate a control function, wherein the or each first elongate member comprises a first surface disposed proximate an outer surface of the apparatus, at least a portion of the first surface forming a mounting surface disposed in contact with the outer surface of the apparatus, and the or each first elongate member comprises a second surface opposing said first surface, the second surface forming an engaging surface for a user, at least a portion of the second surface being configured and arranged to be non-parallel with the mounting surface of said first elongate member.

Optionally, at least a portion of the second surface of the or each first elongate member is configured and arranged to be inclined in a transverse direction with respect to the mounting surface of said first elongate member.

Optionally, at least a portion of the second surface of the or each first elongate member is configured and arranged to be inclined in a longitudinal direction with respect to the mounting surface of said first elongate member.

Optionally, the case comprises a base wall and an end wall, the or each first elongate member being mounted in close proximity to the base wall and a portion of the or each first elongate member extending about the end wall and disposed in close proximity to the end wall.

Optionally, the first elongate member is inherently resilient and flexible.

A second aspect of the present invention provides an apparatus for supplying user inputs to a computer program, such as a game program, for controlling the game program, comprising:
 a case; and
 a plurality of controls located on a front end and top of the apparatus;
 the apparatus being shaped to be held in both hands of a user such that the user's thumbs are positioned to operate controls located on the top of the apparatus and the user's index fingers are positioned to operate controls located on the front end of the apparatus; wherein the apparatus further comprises at least one first additional control located on a base of the apparatus in a position operable by a middle, ring or little finger of a user, the at least one additional control comprising a first elongate member which is displaceable by a user to activate a control function, wherein the case comprises a base wall and end wall, a first portion of the or each first elongate member is mounted in close proximity to the base wall and a second portion of the or each first elongate member extends about the end wall and is disposed in close proximity to the end wall.

Optionally, the base wall comprises a switch and at least part of the first portion of the or each first elongate member disposed adjacent to the base wall forms an actuating surface for actuating the switch.

Optionally, the or each first elongate member comprises a rib extending from the first portion and into the second portion.

Optionally, the rib is disposed adjacent to the actuating surface thereby ensuring actuation of the switch when a user engages with the second portion of the or each first elongate member.

Optionally, the first elongate member is inherently resilient and flexible.

A third aspect of the present invention provides an apparatus for supplying user inputs to a computer program, such as a game program, for controlling the game program, comprising:
a case; and
a plurality of controls located on a front end and top of the apparatus;
the apparatus being shaped to be held in both hands of a user such that the user's thumbs are positioned to operate controls located on the top of the apparatus and the user's index fingers are positioned to operate controls located on the front end of the apparatus; wherein
the apparatus further comprises at least one first additional control located on a base of the apparatus in a position operable by a middle, ring or little finger of a user, the at least one additional control comprising a first elongate member which is displaceable by a user to activate a control function, wherein the or each first elongate member comprises a first surface disposed proximate an outer surface of the apparatus and the or each first elongate member comprises a second surface opposing said first surface, the second surface being configured and arranged to be non-parallel with a portion of the outer surface of the base of the apparatus to which said first elongate member is mounted.

Optionally, the second surface of the or each first elongate member is configured and arranged to be non-parallel with the first surface of said first elongate member.

Optionally, at least a portion of the or each first elongate member is configured and arranged to have a substantially triangular cross section.

Optionally, the first elongate member is inherently resilient and flexible.

Optionally, the apparatus further comprises at least one second additional control located on the base of the apparatus in a position operable by a middle, ring or little finger of a user, the at least one second additional control comprising a second elongate member which is displaceable by a user to activate a control function, wherein the at least one second additional control is disposed adjacent to the at least one first additional control, wherein the second surface of the first elongate member of the at least one first additional control is configured and arranged to direct a user's finger towards the second elongate member disposed adjacent thereto.

Optionally, the first elongate member is inherently resilient and flexible.

Optionally, the or each second elongate member comprises a first surface disposed proximate an outer surface of the apparatus and the or each second elongate member comprises a second surface opposing said first surface, the second surface of the first elongate member being configured and arranged to be non-parallel with the second surface of said second elongate member.

Optionally, the or each first elongate member is disposed outermost.

Optionally, the or each first elongate member is disposed in closer proximity to a handle than a respective adjacent second elongate member.

Optionally, the or each first elongate member comprises a first side edge and a second side edge opposing the first side edge, the first side edge being disposed in closer proximity to a respective adjacent second elongate member than the second side edge, and the second side edge being disposed in closer proximity to a respective adjacent handle than the first side edge, and wherein the first side edge is disposed in closer proximity to a portion of the outer surface of the back of the apparatus to which the first elongate member is mounted than the second side edge.

Optionally, the apparatus is a hand held controller for a games console and comprises a hard outer case wherein the or each elongate member is at least partially disposed in a respective channel formed in a rear surface of the apparatus.

Optionally, the or each elongate member is at least partially disposed in a respective channel formed in a rear surface of the apparatus, the channel being configured and arranged to form a close fit to at least a portion of the elongate member so as to provide lateral support thereto.

Optionally, the or each elongate member comprises a first dimension and the apparatus comprises a cover portion forming a conduit enclosing the elongate member within the respective channel along a portion of the first dimension of the elongate member.

Optionally, the or each elongate member comprises a longitudinal dimension and the apparatus comprises a cover portion forming a conduit enclosing the elongate member within the respective channel along a portion of the longitudinal dimension of the elongate member.

Optionally, the or each elongate member comprises a first part of a complementary locking mechanism.

Optionally, the or each conduit comprises a second part of a complementary locking mechanism.

Optionally, the first or second part of a complementary locking mechanism comprises a catch or barb, which is displaceable so as to release the elongate member from the conduit.

Optionally, the first or second part of a complementary locking mechanism comprises an aperture or recess having an engaging edge.

Optionally, the or each elongate member is formed from material having a thickness less than 10 mm.

Optionally, the or each elongate member is formed from material having a thickness less than 5 mm.

Optionally, the or each elongate member is formed from material having a thickness between 1 mm and 3 mm.

Optionally, the or each of the elongate members are parallel with respect to one another.

Optionally, the or each of the elongate members converge towards the front end of the apparatus with respect to one another.

Optionally, a portion of the or each elongate member is in registry with a switch mechanism disposed within the apparatus, such that displacement of the elongate member activates the switch mechanism.

Optionally, a switch mechanism is disposed between the or each elongate member and an outer surface of the base of the apparatus.

Optionally, a switch mechanism is mounted to a rear panel of the apparatus wherein the switch mechanism comprises an engaging surface, the engaging surface being disposed in an aperture in an outer surface of the rear panel and arranged flush with an outer surface of the rear panel.

Optionally, a switch mechanism is mounted to a rear panel of the apparatus wherein the switch mechanism comprises an engaging surface, the engaging surface being recessed within an aperture defined in an outer surface of the rear panel.

Optionally, the additional controls are paddle levers.

Optionally, the additional controls are substantially vertically orientated with respect to the apparatus.

Optionally, the additional controls are formed separately from the outer case of the apparatus.

A fourth aspect of the present invention provides an apparatus for supplying user inputs to a computer program, such as a game program, for controlling the game program, comprising:
 a case comprising a base panel having a first portion and a second portion, the second portion arranged to be at an angle to the first portion so as to define a corner; and
 a plurality of controls located on a front end and top of the apparatus;
 the apparatus being shaped to be held in both hands of a user such that the user's thumbs are positioned to operate controls located on the top of the apparatus and the user's index fingers are positioned to operate controls located on the front end of the apparatus; wherein
 the apparatus further comprises at least one first additional control located on a base of the apparatus in a position operable by a middle, ring or little finger of a user, the at least one additional control comprising an elongate member,
 the elongate member comprising:
  a first portion arranged to be in close proximity to the first portion of the base panel; and
  a second portion arranged to be in close proximity to the second portion of the base panel.

A fifth aspect of the present invention provides an apparatus for supplying user inputs to a computer program, such as a game program, for controlling the game program, comprising:
 a case having a base panel comprising:
  a first portion; and
  a second portion arranged to be at an angle to the first portion so as to define a corner; and
 a plurality of controls located on a front end and top of the apparatus;
 the apparatus being shaped to be held in both hands of a user such that the user's thumbs are positioned to operate controls located on the top of the apparatus and the user's index fingers are positioned to operate controls located on the front end of the apparatus; wherein
 the apparatus further comprises at least one additional control located on a base of the apparatus in a position operable by a middle, ring or little finger of a user, the at least one additional control comprising an elongate member, the elongate member being non-linear in shape so as to be complementary to the shape of the base panel.

A sixth aspect of the present invention provides an apparatus for supplying user inputs to a computer program, such as a game program, for controlling the game program, comprising:
 a case having a base panel comprising:
  a base portion; and
  an end portion arranged to be at an angle to the base portion so as to define a corner; and
 a plurality of controls located on a front end and top of the apparatus;
 the apparatus being shaped to be held in both hands of a user such that the user's thumbs are positioned to operate controls located on the top of the apparatus and the user's index fingers are positioned to operate controls located on the front end of the apparatus; wherein
 the apparatus further comprises at least one additional control located on a base of the apparatus in a position operable by a middle, ring or little finger of a user;
 the at least one additional control comprising:
  a first portion arranged to be in close proximity to the base portion; and
  a second portion arranged to be in close proximity to the end portion of the base panel.

Further features and advantages of the present invention will be apparent from the specific embodiment illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which:

FIG. 9A is a perspective view from below of the actuators of the games controller of FIG. 1;

FIG. 9B is a plan view from below of one of the actuators of the games controller of FIG. 9A;

FIG. 9C is a plan view from above of the actuator of FIG. 9B;

FIG. 9D is a first side view of the actuator of FIG. 9B;

FIG. 9E is a second side view of the actuator of FIG. 9B;

FIG. 9F is a first end view of the actuator of FIG. 9B;

FIG. 9G is a second end view of the actuator of FIG. 9B;

FIG. 20A is a perspective view of a first one of the alternative actuators of FIG. 17; and FIG. 20B is a perspective view of a second one of the alternative actuators of FIG. 17.

DETAILED DESCRIPTION

Detailed descriptions of specific embodiments of game controllers and actuators are disclosed herein. It will be understood that the disclosed embodiments are merely examples of the way in which certain aspects of the invention can be implemented and do not represent an exhaustive list of all of the ways the invention may be embodied. Indeed, it will be understood that the game controllers and actuators described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
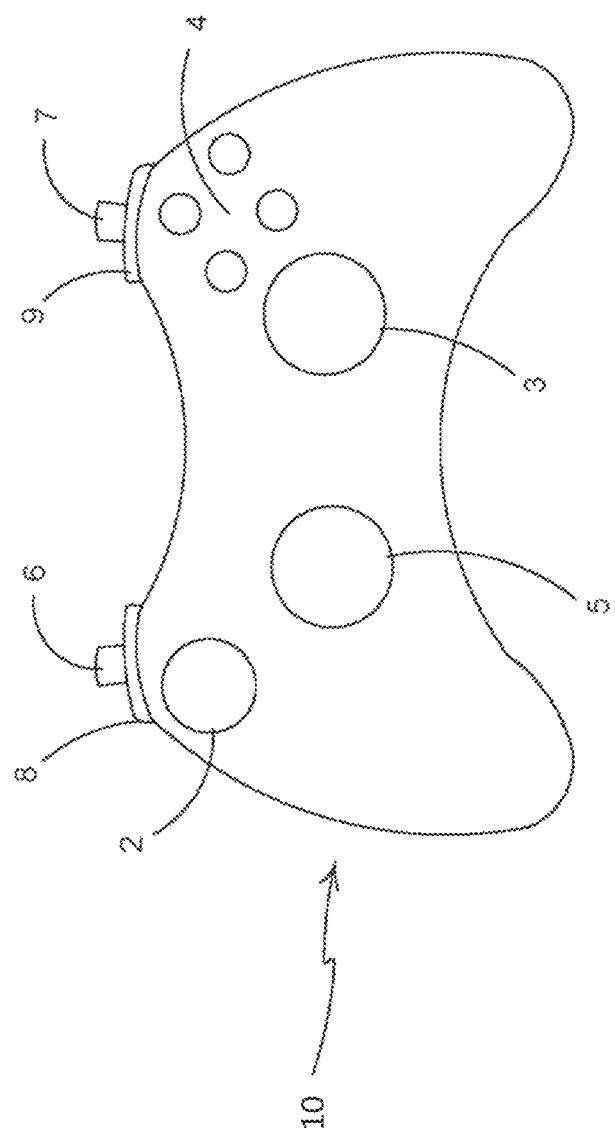
FIG. 1 is a schematic illustration of the top of a games console controller according to one embodiment.

Referring to FIG. 1, there is shown a controller 10 according to an embodiment of the invention. The controller 10 comprises an arrangement of game controls that are mounted on the front and top of the controller 10. The controller 10 comprises a left analogue thumb stick 2 and a right analogue thumb stick 3. The left analogue thumb stick 2 and the right analogue thumb stick 3 normally control movement actions and are intended to be operated by the user's left and right thumbs respectively. The controller 10 comprises four buttons 4, located on a top right portion of the controller 10, which normally control additional in-game actions and that are intended to be operated by the user's right thumb. The controller 10 comprises a direction pad 5 located on the lower portion of the top left of the controller 10. The direction pad 5 is intended to be operated by the user's left thumb, and typically is used either as an alternative to the left thumb stick 2, or to provide additional actions. The controller 10 also comprises a left trigger body 6, a right trigger body 7, a left bumper 8 and a right bumper 9 located on the front edge of the controller 10. The left and right trigger bodies 6, 7 are typically operated by a user's index fingers or forefingers. The left and right bumpers 8, 9 may also be operated by a user's index fingers or forefingers. It will be understood that the arrangement of game controls illustrated in respect of the present embodiment is optional and may vary in other game controllers embodying the present invention, which may be applied to a variety of actuators as described below.

Figure 2:
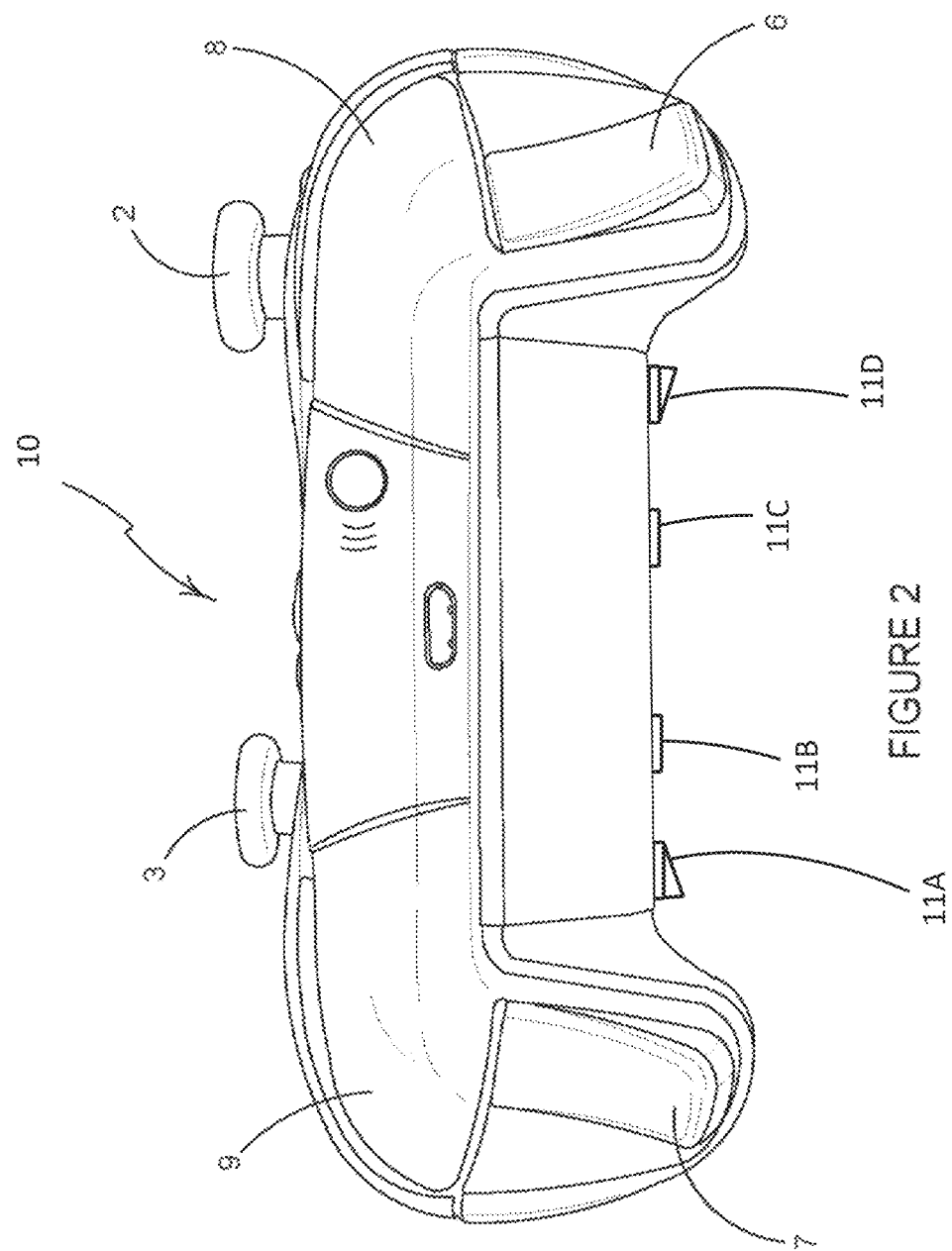
FIG. 2 is a front view of the games console controller of FIG. 1.

FIG. 2 illustrates a front view of the controller 10 of FIG. 1. It can be seen that the left trigger body 6 is mounted below the left bumper 8 and the right trigger body 7 is mounted below the right bumper 9.

The only way to operate the four buttons 4 is for a user to remove their right thumb from the right thumb stick 3. This takes time and, in some games, can cause the loss of control. This is a particular problem in games where the right thumb stick 3 is used for aiming. A similar problem may arise in games where the direction pad 5 provides additional actions and the user has to remove their thumb from the left thumb stick 2 in order to operate the direction pad 5.

In light of the above, there is a need for an improved controller, which removes the requirement for a user to remove their thumbs from the left or right thumb stick 2, 3 in order to operate additional actions controlled by the four buttons 4 and/or the direction pad 5.

Figure 3:
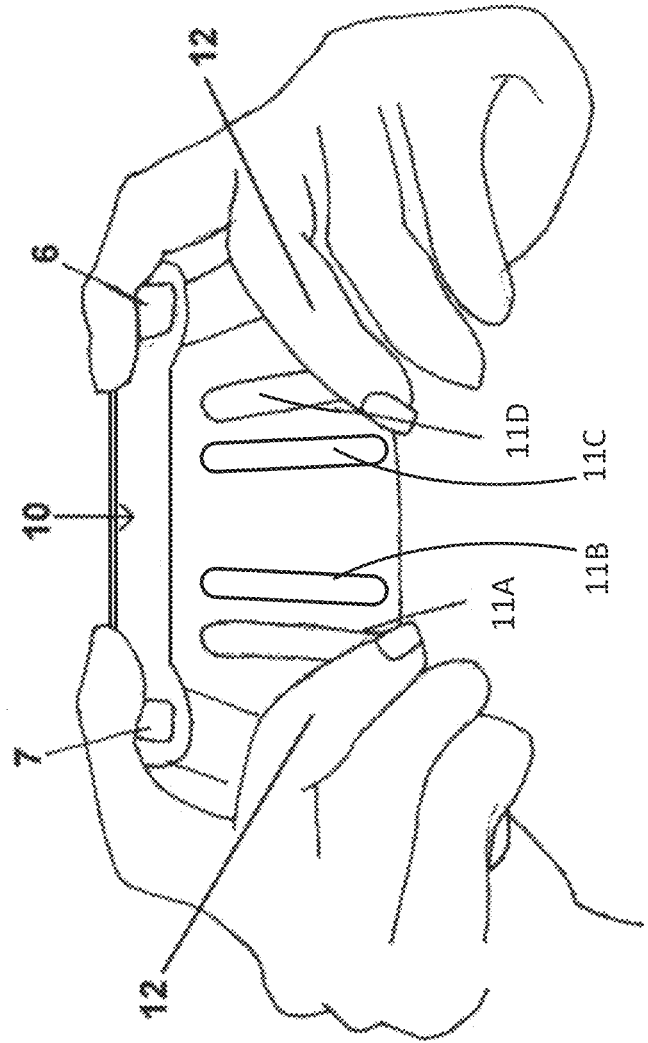
FIG. 3 is a schematic illustration from below of the base panel of the games controller of FIG. 1 showing a user's hands.

The rear of the games controller 10 is illustrated in FIGS. 3 to 8. The controller 10 comprises four paddle levers 11A, 11B, 11C, 11D located on the bottom of the controller. The paddle levers 11A, 11B are substantially orientated in parallel with respect to a first handle portion H1 of the controller 10 and are positioned to be operated by the middle, ring or little fingers of a user 12, as shown in FIG. 3. The paddle levers 11C, 11D are substantially orientated in parallel with respect to a second handle portion H2 of the controller 10 and are positioned to be operated by the middle, ring or little fingers of a user 12, as shown in FIG. 3.

In one embodiment the paddles 11A, 11B, 11C, 11D are formed from a thin, flexible material such as a plastics material, for example polyethylene. Preferably, the paddles 11A, 11B, 11C, 11D are less than 10 mm thick, but may be less than 5 mm thick.

The paddles 11A, 11B, 11C, 11D are inherently resilient, that is to say that they return to an unbiased position when not under load. A user may displace or depress any one of the paddles 11A, 11B, 11C, 11D by engaging an outer surface thereof; such displacement causes the actuated paddle 11A, 11B, 11C, 11D to activate a switch mechanism (not shown) mounted in vertical registry with a portion of each paddle within the body of the controller 10. A portion of the switch mechanism may extend through the controller body and be disposed in close proximity to, or in contact with, an innermost surface of the paddles 11A, 11B, 11C, 11D.

The paddles 11A, 11B, 11C, 11D are mounted between the first handle portion H1 and the second handle portion H2 located on the base of the controller 10, and are disposed in close proximity to the outer surface of the controller body.

It is envisaged that the paddles 11A, 11B, 11C, 11D could be fitted to an existing controller 10. In such embodiments, the paddles would be mounted onto an outer surface of the controller body. In the illustrated embodiment, the paddles are fixed by a screw mechanism. A screw 15, having an external screw thread, is received in each of a pair of apertures provided in each of the paddles 11A, 11B, 11C, 11D. The apertures for receiving the screws 15 are provided at one end of the paddles 11A, 11B, 11C, 11D; this is a fixed end. The other end of the paddles 11A. 11B, 11C, 11D is moveable. In this way, the paddles 11A, 11B, 11C, 11D can be bent or deformed temporarily. The inherent resilience of the paddles 11A, 11B, 11C, 11D returns the paddles 11A, 11B. 11C, 11D substantially to their starting position when released, and allows the switch mechanism to do the same. The screws 15 are received in the base of the controller 10 in a respective aperture having an internal screw thread. It is envisaged that the internal screw thread may be pre-tapped into the base portion of the controller body, or may be created when driving the screws 15 into the base portion of the controller body, for example by using a self-tapping screw 15. It is also envisaged that the internal screw thread may be provided directly in the material forming the base portion of the controller body or may be provided in a separate insert or nut secured to, or in, the controller body. In alternative embodiments other fixing means are envisaged, for example the paddles 11A, 11B, 11C, 11D may be bonded or adhesively secured to the controller body; in other embodiments the paddles 11A. 11B, 11C, 11D may comprise an integrally formed clip or locking device such as a detent or barb for being engaged with a receiver located on the controller body. In still further embodiments, the paddles 11A, 11B, 11C, 11D may be integrally formed with a cover panel or portion of the base panel of the controller such as but not limited to a battery hatch.

Figure 4:
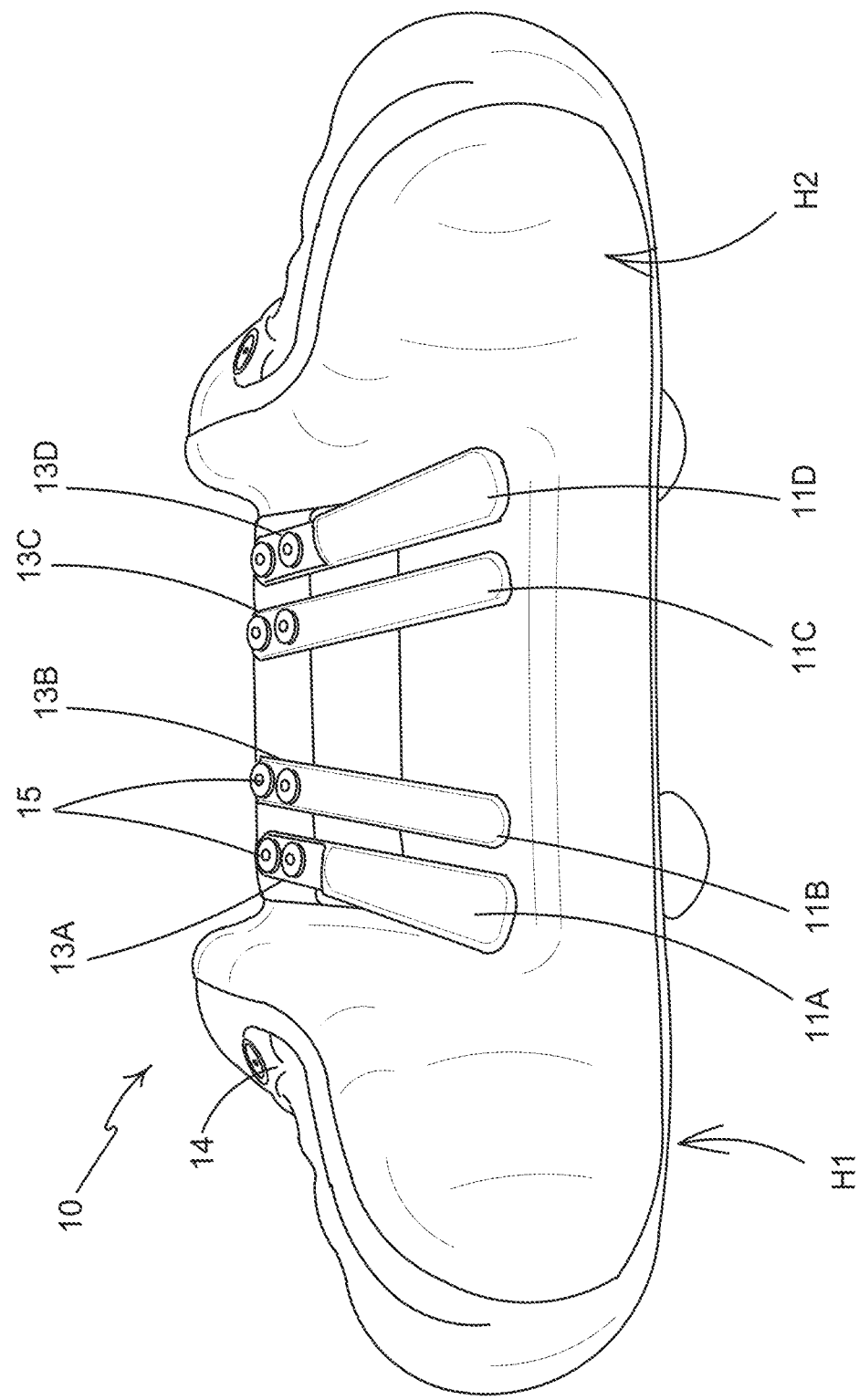
FIG. 4 is a perspective view from below of the base panel of the games controller of FIG. 1.
Figure 5:
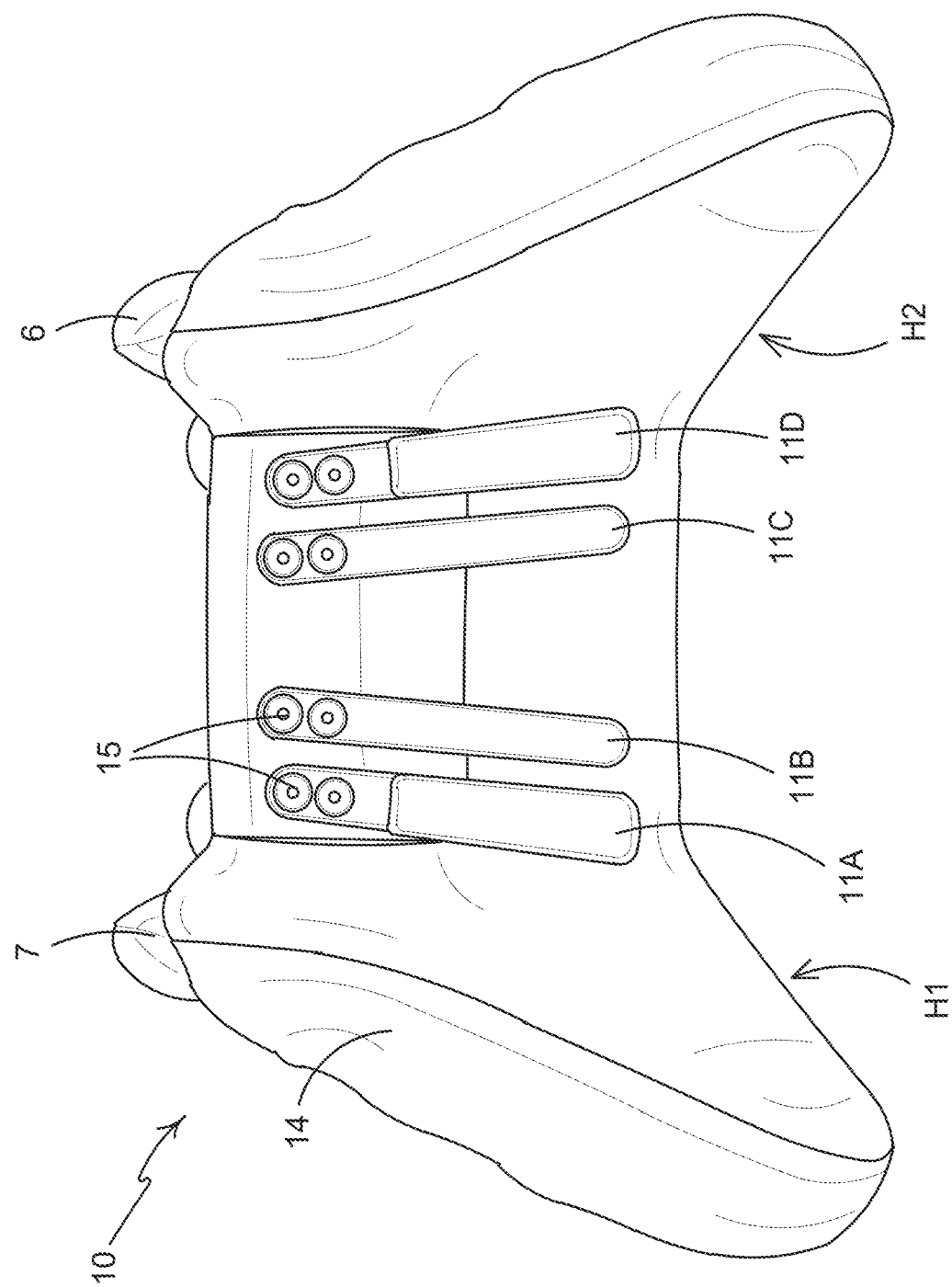
FIG. 5 is a plan view from below of the base panel of the games controller of FIG. 1.
Figure 6:
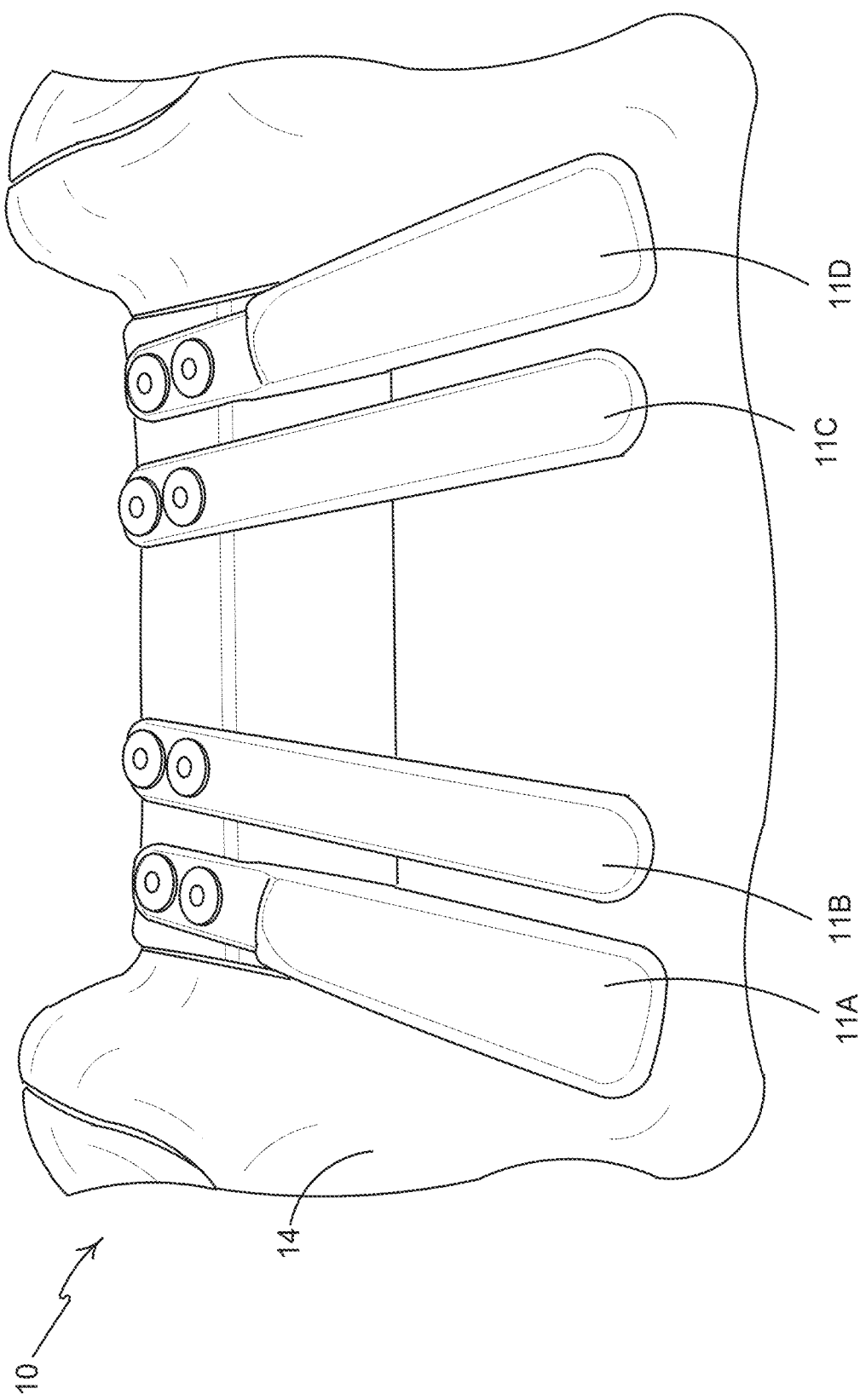
FIG. 6 is an enlarged perspective view of additional actuators mounted to the base panel of the games console controller of FIG. 1.

Optionally, the base of the controller 10 is provided with four channels 13A, 13B, 13C, 13D, best shown in FIG. 4. Each channel receives a respective one of the paddles 11A, 11B, 11C. 11D. In the illustrated embodiment the channels 13A, 13B, 13C, 13D are arranged to receive an end portion of the respective paddle 11A, 11B, 11C, 11D. This is achieved by reducing the depth of the channels 13A, 13B, 13C, 13D towards one end to nothing, such that the channels 13A, 13B, 13C, 13D are tapered. This provides that one end of each of the paddles 11A, 11B, 11C, 11D stands proud of the base of the controller 10, best shown in FIG. 6. In this way, a user can readily engage with the paddles 11A, 11B, 11C, 11D. The channels 13A, 13B, 13C, 13D provide stability to the paddles 11A, 11B, 11C, 11D. This increases the durability of the paddles and of the fixing means.

The channels 13A, 13B, 13C, 13D reduce the likelihood of the paddles 11A, 11B, 11C, 11D rotating about the fixing end when engaging with the moveable end. The channels serve to restrict movement of the paddles 11A, 11B, 11C, 11D in a direction substantially perpendicular to the base of the controller as indicated by direction arrow D1 in FIG. 7.

In this way, a user may engage the paddles 11A. 11B, 11C, 11D with the tips of the fingers, preferably the middle fingers, without compromising the user's grip on the controller 10. However, it is envisaged that a user could use the ring or little finger. The index fingers may simultaneously engage trigger style controls mounted on the forward end of the controller 10 whilst the thumbs may be used to activate controls on the top of the controller 10.

The paddles 11A, 11B, 11C, 11D are elongate in shape and substantially extend in a direction from the front to the rear of the controller 10. In one embodiment, the pair of paddles 11A, 11B are orientated such that they converge towards the forward end with respect to the pair of paddles 11C. 11D; the pair of paddles 11A, 11B are orientated parallel with respect to one another, and the pair of paddles 11C, 11D are orientated parallel with respect to one another. In an alternative embodiment, the paddles 11A, 11B, 11C, 11D are orientated parallel with respect to one another. The elongate shape of the paddles allows a user to engage the paddles with any of the middle, ring or little fingers; it also provides that different users, having different sized hands, can engage with the paddles in a comfortable position.

Each of the four paddle levers 11A, 11B, 11C, 11D can replicate the function of one of the four buttons 4 located on the top of the controller 10, and thereby allow a user 12 to operate the functions of the relevant buttons using their middle fingers 12, without the need to remove either of their thumbs from the left or right thumb stick 2, 3. In alternative embodiments, the paddle levers 11A, 11B, 11C, 11D may activate a new function not activated by the controls on the top of the controller 10.

Figure 7:
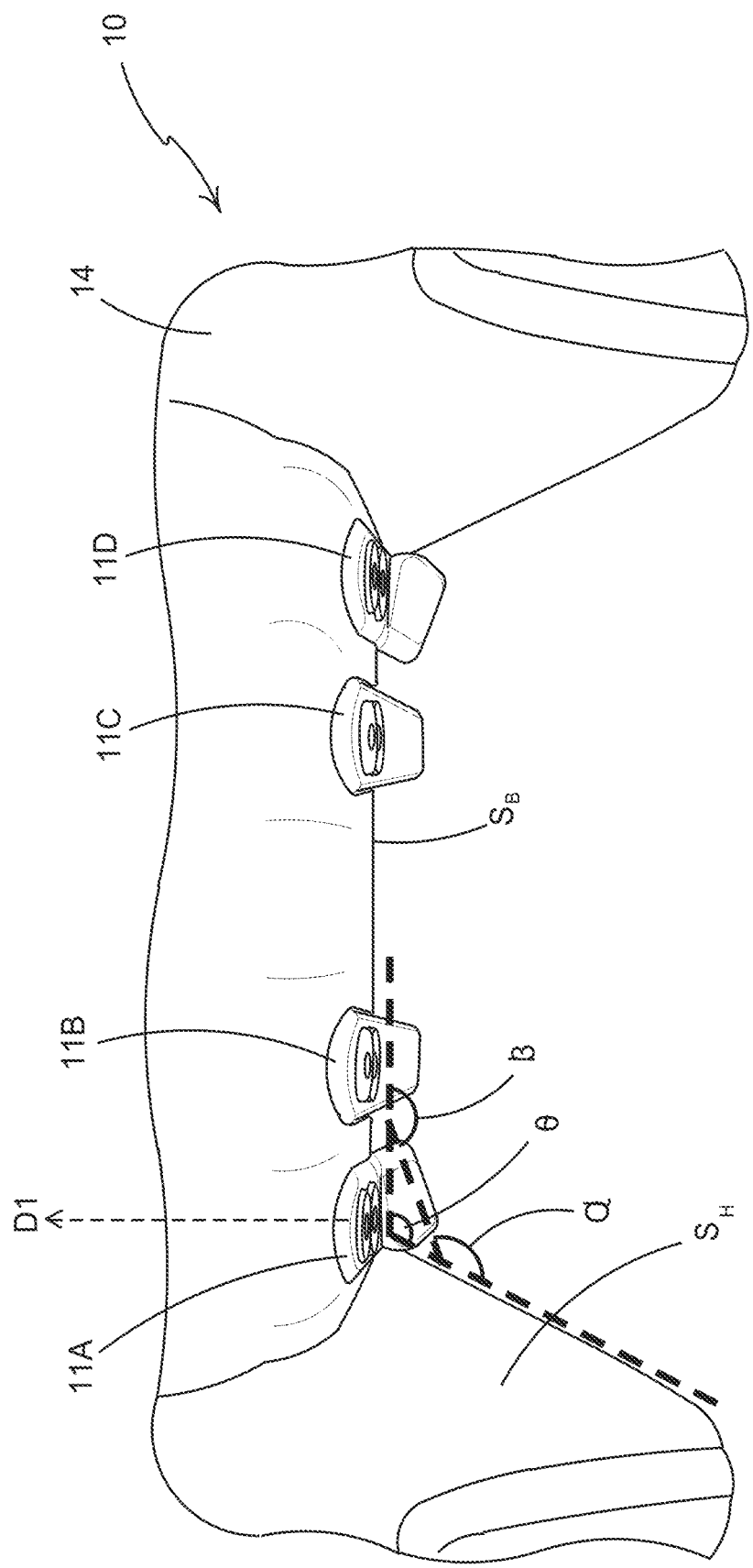
FIG. 7 is an enlarged front view of the games controller of FIG. 1 showing the relationship between the paddles and the base panel and handles.
Figure 8:
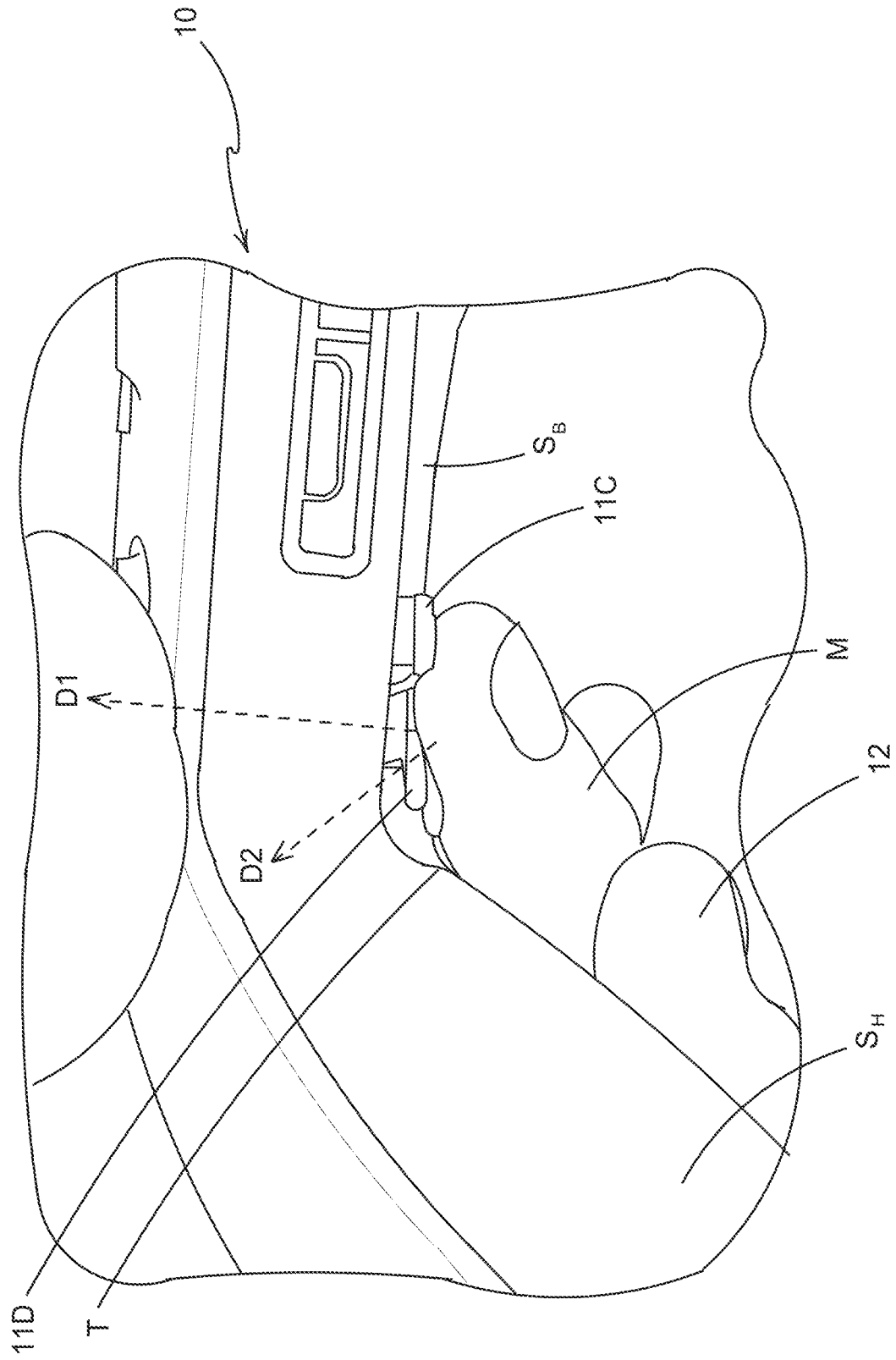
FIG. 8 is an enlarged rear view of the games console controller of FIG. 1 showing the paddles in use by a user.

The handles H1, H2 comprise an inner surface $S_H$, best shown in FIGS. 7 and 8. The inner surface $S_H$ is engaged by the middle, ring and little fingers of a user's 12 hands. The ring and little fingers are increasingly important for grip of the controller when the middle fingers are employed actuating the paddles 11A, 11B, 11C, 11D. The inner surface $S_H$ of each the handles H1, H2 meets an inner surface $S_B$ of a region of the base of the controller 10 upon which the paddles 11A, 11B, 11C, 11D are mounted. The inner surface $S_H$ is inclined at a steep angle θ (best shown in FIG. 7) with respect to the inner surface $S_B$ of the controller base. This angle is equal to or greater than 45 degrees; optionally it may be between about 50 degrees to about 60 degrees. The handles H1, H2 have a substantially flat upper portion T. The flat portion T meets the inner surface $S_B$ to define an internal corner or edge; the corner or edge is sharp, that is to say the corner or edge has a small radius of curvature. In this way, the handles H1, H2 provide an ergonomic shape for being grasped by the ring and little fingers of a user's 12 hands.

The outermost paddles 11A, 11D are shaped such that when a user 12 engages with a respective one of the outermost paddles 11A, 11D their engaging finger, that is to say the finger or fingers they use to interact with said respective one of the outermost paddles 11A, 11D, is directed towards the respective adjacent paddle 11B, 11C. In this way, the user 12 can readily find the adjacent paddle 11B, 11C. The user 12 need not disengage or lift off the outermost paddles 11A, 11D but maintain touching contact therewith whilst actuating one of the inner paddles 11B, 11C. It is envisaged that the user will not depress (so as to actuate the switch mechanism) both of an outermost paddle 11A, 11D and an adjacent neighbor simultaneously but will actuate the paddles independently. However, it will be appreciated that simultaneous actuation of the outermost paddle 11A. 11B and its adjacent neighbor 11B, 11C is facilitated by the shape and/or orientation of the lowermost surface of the outermost paddles 11A, 11D.

FIG. 8 illustrates a user 12 holding a controller 10. The user's finger M, in this illustration a middle finger of the left hand, is in touching contact with both the paddle 11D and the paddle 11C. The user 12 engages the paddle 11C with the fingertip or end and engages the paddle 11D with the finger pad (the region opposing the fingernail). It will be appreciated that the user may engage the paddles 11D, 11C in a similar manner with the ring or little finger of the left hand. It will be appreciated that the user may engage the paddles 11A, 11B in a similar manner with the middle, ring or little finger of the right hand.

As illustrated in FIG. 7 the lower surface of the paddles 11A, 11D are orientated so as to define an angle α with respect to the surface $S_H$ and to define an angle β with respect to the surface $S_B$. The angle α is larger than the angle θ, and the angle β is larger than the angle θ.

The alignment of the lower surface of the outermost paddles 11A, 11D also reduces the likelihood of a user's finger M slipping off the outermost paddle 11D with which it is engaged. This is especially useful since the finger M may also be being employed by the user to grasp or support the controller 10.

In addition, the paddles 11A, 11D provide a tactile recognition device. The user will be able to readily recognize which of the paddles 11A, 11B, 11C, 11D the finger M is engaging by the feel of the paddle 11A, 11B, 11C, 11D.

The alignment of the lower surface of the outermost paddles 11A, 11D also allows a user to squeeze the outermost paddle 11A, 11D. That is to say, the user can flex or bend the finger M to actuate the outermost paddle 11A, 11D. This may facilitate a user to maintain a firm grasp of the controller 10 since the finger M is acting to grasp the handle H1, H2 tighter. The shape of the outer paddles 11A, 11D in effect directs a portion of the force received from flexing of the finger M onto the switch mechanism so as to actuate the switch mechanism. The direction of actuation of the switch mechanism is indicated by direction arrow D1 in FIGS. 7 and 8. The direction of movement of the end of the finger M is substantially in the direction of direction arrow D2, albeit the finger M will pivot about the joints of the finger.

FIGS. 9A to 9G illustrate the outermost paddles 11A, 11D. FIG. 9A shows a perspective view of the paddles 11A and 11D from below. The paddles 11A, 11D each comprises a pair of apertures 21, 23 disposed substantially at a first end thereof for fixing the paddles 11A, 11D to the controller 10. As shown in FIGS. 9B and 9D the paddle 11A comprises lower surface 18. The paddle 11A comprises an upper surface 20 as shown in FIGS. 9E, 9F and 9G. At least a portion of the lower surface 18 is shaped and configured to be mounted in close proximity to an outer surface of the controller body 14.

The upper surface 20 is shaped and arranged to be disposed at an angle to the mounting portion of the lower surface 18. It will be appreciated that this can be achieved by shaping at least a portion of the paddle 11A so as to have a substantially triangular cross section. In other embodiments, the paddle can be formed with a twist or helical shape such that the upper surface 20 is at least in part orientated at a non-zero angle with respect to the mounting portion of the lower surface 18.

In the illustrated embodiment the lower surface 18 of each of the paddles 11A, 11D comprises a first portion 24 and a second portion 26. The second portion 26 is orientated at a non-zero angle to the first portion 24; this is best illustrated in FIG. 9A. The first portion 24 forms a mounting surface.

An end portion of the paddles 11A, 11D comprising the apertures 21, 23 is uniplanar on the lower surface 18. The upper surface 20 of this end portion is substantially parallel to the portion of the lower surface 18 disposed in vertical registry therewith. In this way, the screws 15 or other fixing means act perpendicularly to hold the paddle 11a, 11D against the controller body 14.

Optionally, the paddles are tapered along their longitudinal axis, such that the paddles 11A, 11D are thinner towards a second end, the second end opposing the first end. In this way the upper surface 20 can be inclined in two directions; the paddle is banked towards the adjacent paddle 11B, 11C and ramped so as to rise upwardly towards the front of the controller. This may be advantageous for allowing a single paddle to be comfortably engaged by a plurality of different users so as to accommodate a variety of hand sizes. For example, a user with smaller hands may find it more comfortable to engage paddles 11A, 11D closer to the front of the controller 10, whereas a user with larger hands may be more inclined to employ the tail of the paddle 11A, 11D towards the rear of the controller 10.

Referring now to FIGS. 10 to 20B, there are shown alternative embodiments. In the second and third illustrated embodiments, like numerals have, where possible, been used to denote like parts, albeit with the addition of the prefix "100", "200" to indicate that these features belong to the second or third embodiment respectively. The alternative embodiments share many common features with the first embodiment and therefore only the differences from the embodiment illustrated in FIGS. 1 to 9G will be described in any greater detail.

The controller 110 comprises an arrangement of game controls that are mounted on the front and top of the controller 110. The controller 110 comprises a left analogue thumb stick (not shown) and a right analogue thumb stick (not shown). The left analogue thumb stick and the right analogue thumb stick normally control movement actions and are intended to be operated by the user's left and right thumbs respectively. The controller 110 comprises four buttons (not shown), located on a top right portion of the controller 110, which normally control additional in-game actions and that are intended to be operated by the user's right thumb. The controller 110 comprises a direction pad (not shown) located on top of the controller 110. The direction pad is intended to be operated by the user's left thumb, and typically is used either as an alternative to the left thumb stick, or to provide additional actions. The controller 110 also comprises a left trigger body 106 and a right trigger body 107 located on the front edge of the controller 110. The left and right trigger bodies 106, 107 are typically operated by a user's index fingers or forefingers. It will be understood that the arrangement of game controls illustrated in respect of the present embodiment is optional and may vary in other games controllers embodying the present invention, which may be applied to a variety of actuators as described below.

The only way to actuate the four buttons on the top of the controller 110 is for a user to remove their right thumb from the right thumb stick. There is a need for a controller that removes the requirement for a user to remove their thumbs from the left or right thumb stick in order to operate additional actions controlled by the four buttons and/or the direction pad.

Figure 10:
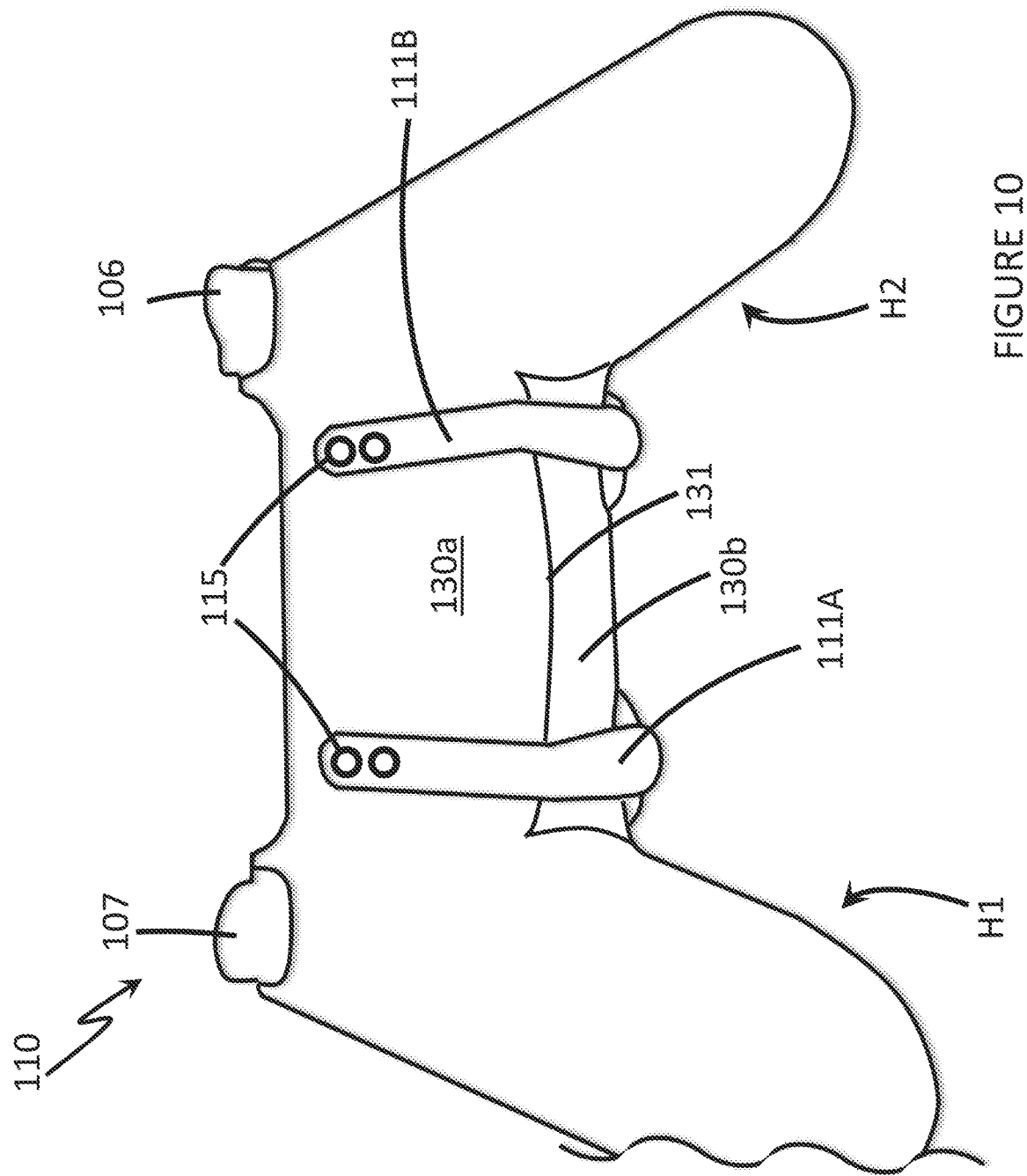
FIG. 10 is a schematic illustration from below of a base panel of a games controller according to another embodiment.
Figure 11:
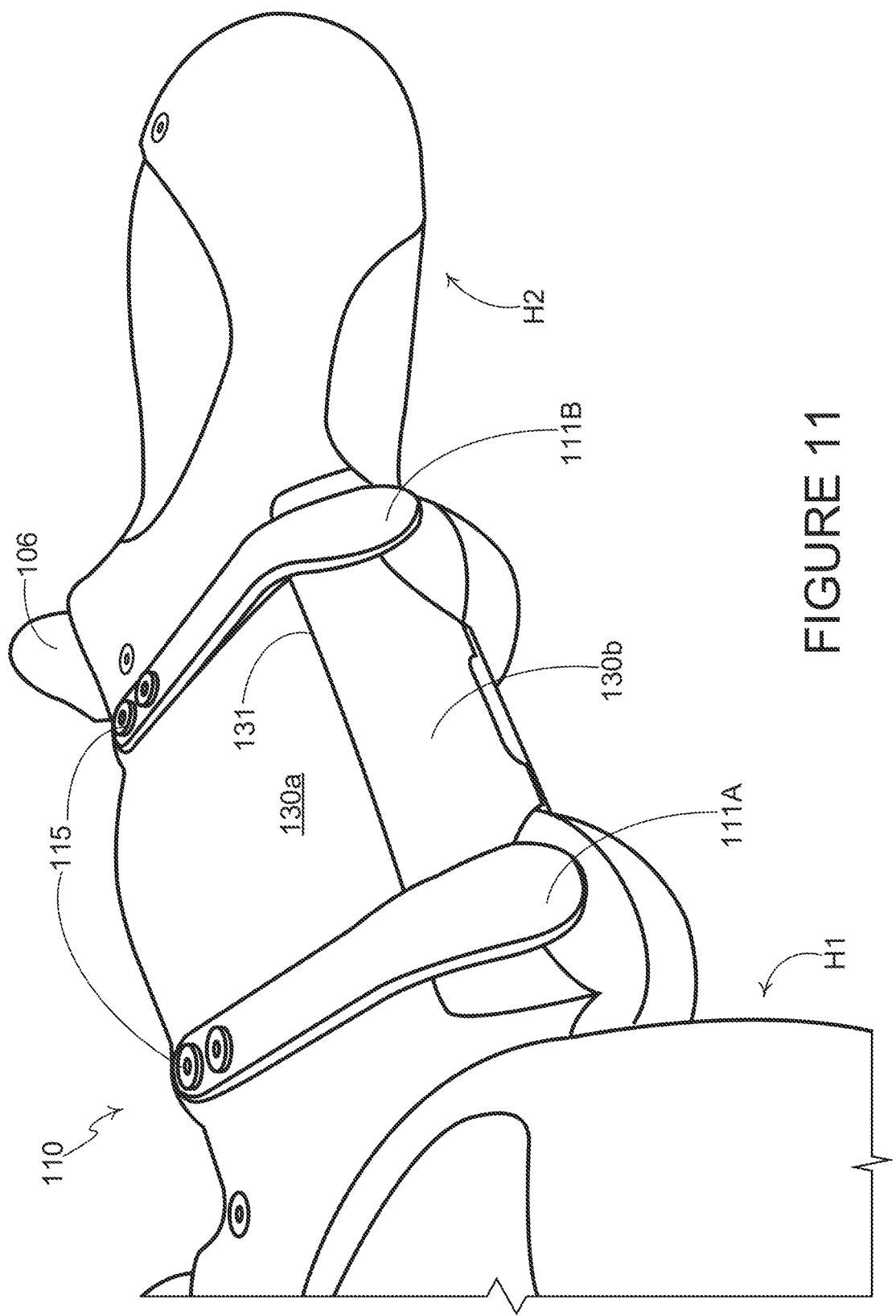
FIGS. 11 and 12 are perspective views from below of the base panel of the games controller of FIG. 10.
Figure 12:
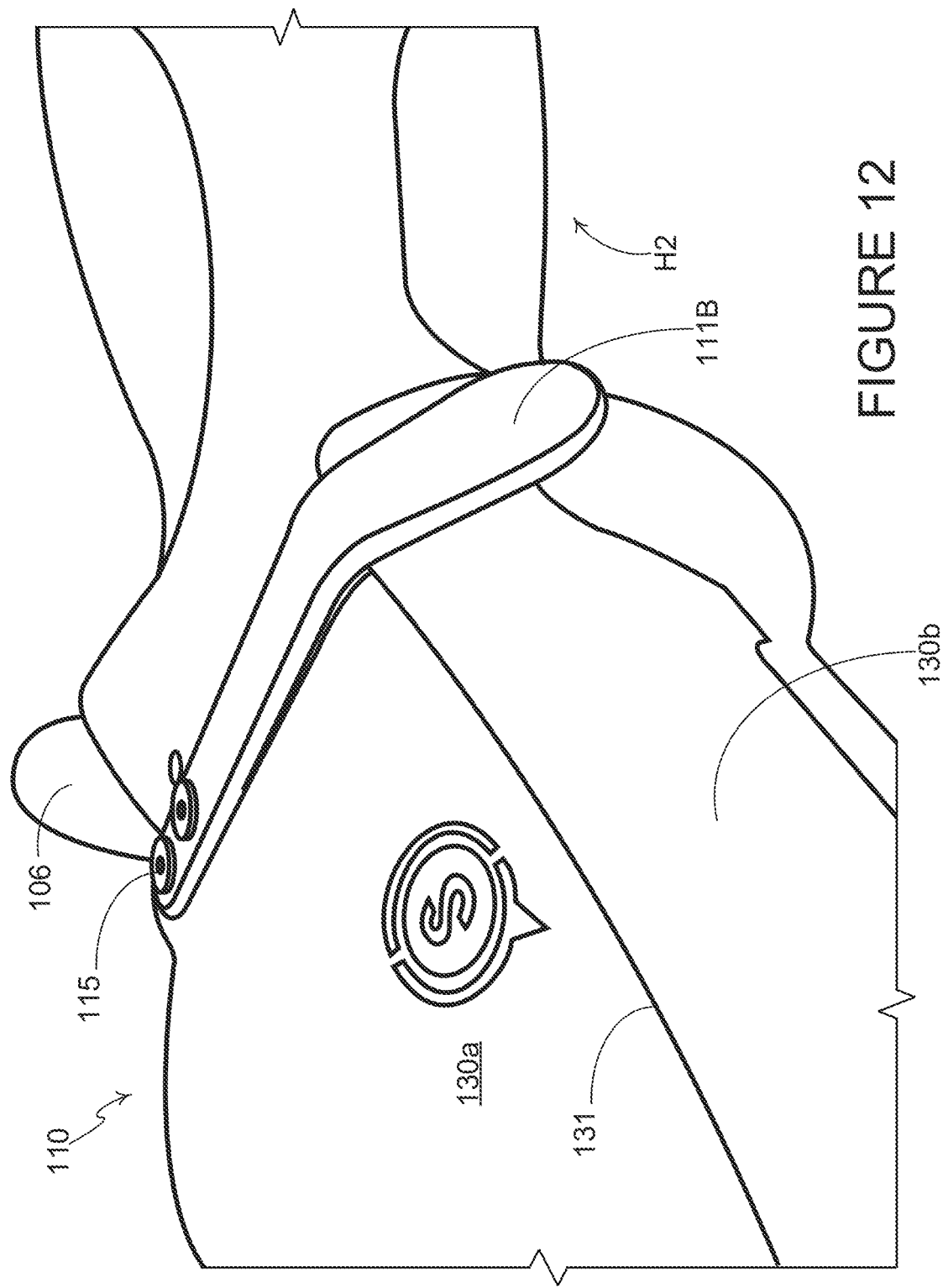
Figure 13:
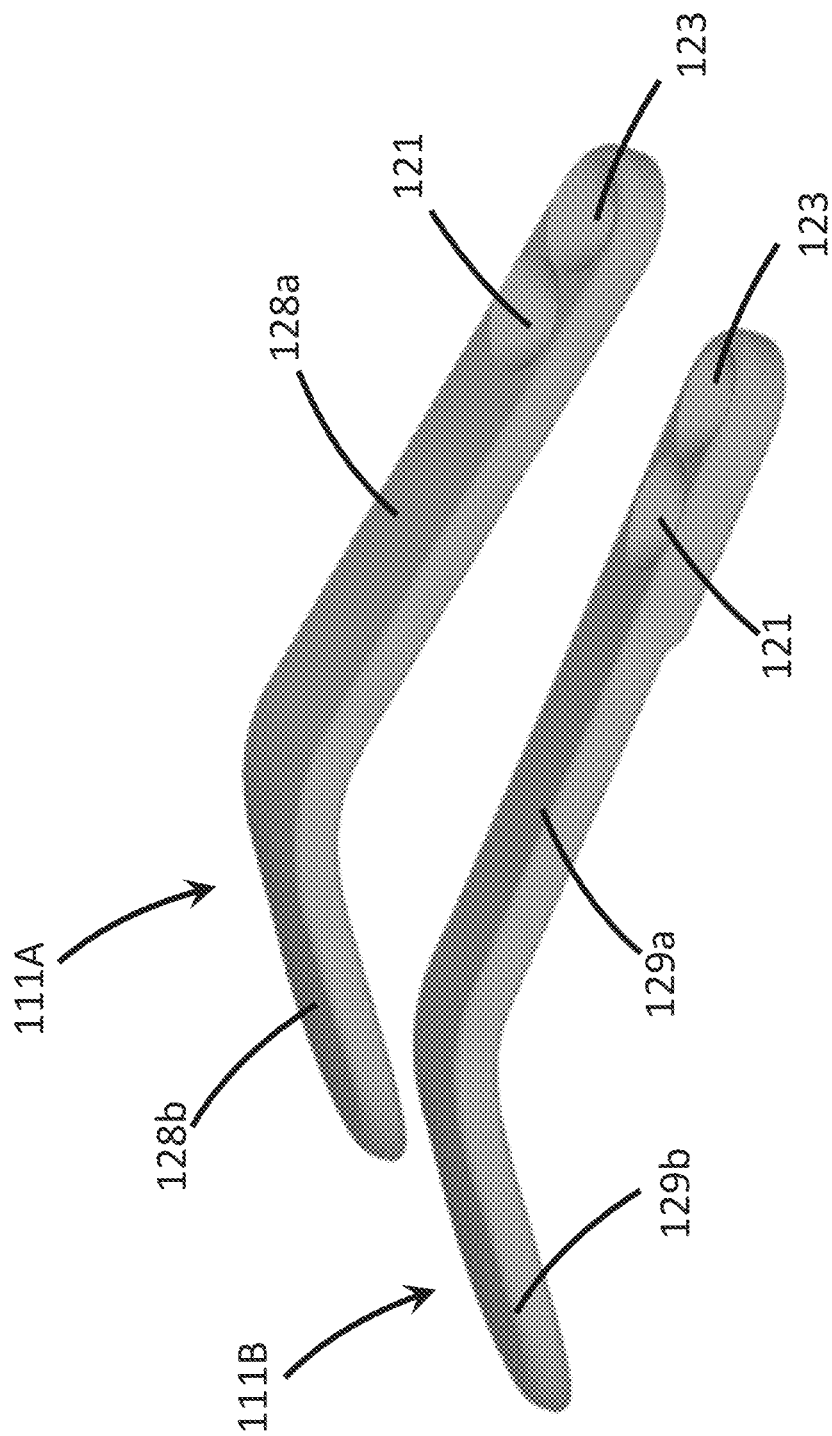
FIG. 13 is a perspective view from below of the actuators of the games controller of FIG. 10.

The rear of the games controller 110 is illustrated in FIGS. 10 to 12. The controller 110 comprises two paddle levers 111A, 111B, located on the bottom or rear of the controller.

In one embodiment the paddles 111A, 111B are formed from a thin, flexible material such as a plastics material, for example polyethylene. Preferably, the paddles 111A, 111B are less than 10 mm thick, but may be less than 5 mm thick.

The paddles 111A, 111B are inherently resilient, that is to say that they return to an unbiased position when not under load. A user may displace or depress any one of the paddles 111A, 111B by engaging an outer or lower surface thereof; such displacement causes the actuated paddle 111A, 111B to activate a switch mechanism (not shown) mounted in vertical registry with a portion of each paddle within the body of the controller 110. A portion of the switch mechanism may extend through the controller body and be disposed in close proximity to, or in contact with, an innermost surface of the paddles 111A, 111B.

The paddles 111A, 111B are mounted between a first handle portion H1 and a second handle portion H2 located on the base of the controller 110, and are disposed in close proximity to the outer surface of the controller body.

The paddles 111A, 111B, are elongate in shape and substantially extend in a direction from the front to the rear of the controller 110. In one embodiment, the pair of paddles 111A. 111B is orientated such that they converge towards each other towards the forward end of the controller 110.

It is envisaged that the paddles 111A, 111B could be retrofitted to an existing controller 110. In such embodiments, the paddles may be mounted on an outer surface of the controller body. In the illustrated embodiment, the paddles 111A, 111B are fixed by a screw mechanism. A screw 115, having an external screw thread, is received in each of a pair of apertures 121, 123 (see FIGS. 13 to 15) provided in each of the paddles 111A, 111B. The apertures 121, 123 for receiving the screws 115 are provided at one end of the paddles 111A, 111B; this is a fixed end. The other end of the paddles 111A, 111B is moveable.

The base panel or chassis member of controller 110 comprises a base portion 130a and an end portion 130b. The end portion 130b is arranged to be at an angle to the base portion 130a and defines a corner 131. The paddles 111A, 111B are configured and arranged complementarily to the base portion 130a and the end portion 130b such that a first portion 128a, 129a of each paddle 111A, 111B is disposed in close proximity to the base portion 130a and a second portion 128b, 129b of each paddle 111A, 111B is disposed in close proximity to the end portion 130b. The paddles 111A, 111B are non-linear in shape and are molded to be complementary to the shape of the base panel of the controller 110.

Optionally, the paddles 111A, 111B are arranged so as to be wider at the free end than at the fixed end. Preferably, an inner side edge of the second portion 128b, 129b is divergently arranged with respect to the outer side edge of the second portion 128b, 129b. The inner side edge of the second portion 128b, 129b is non-linear or orientated at an angle with respect to an inner side edge of the first portion 128a, 129a. The outer side edge of the second portion 128b, 129b is arranged to be collinear with the outer side edge of the first portion 128a, 129a.

Figure 14:
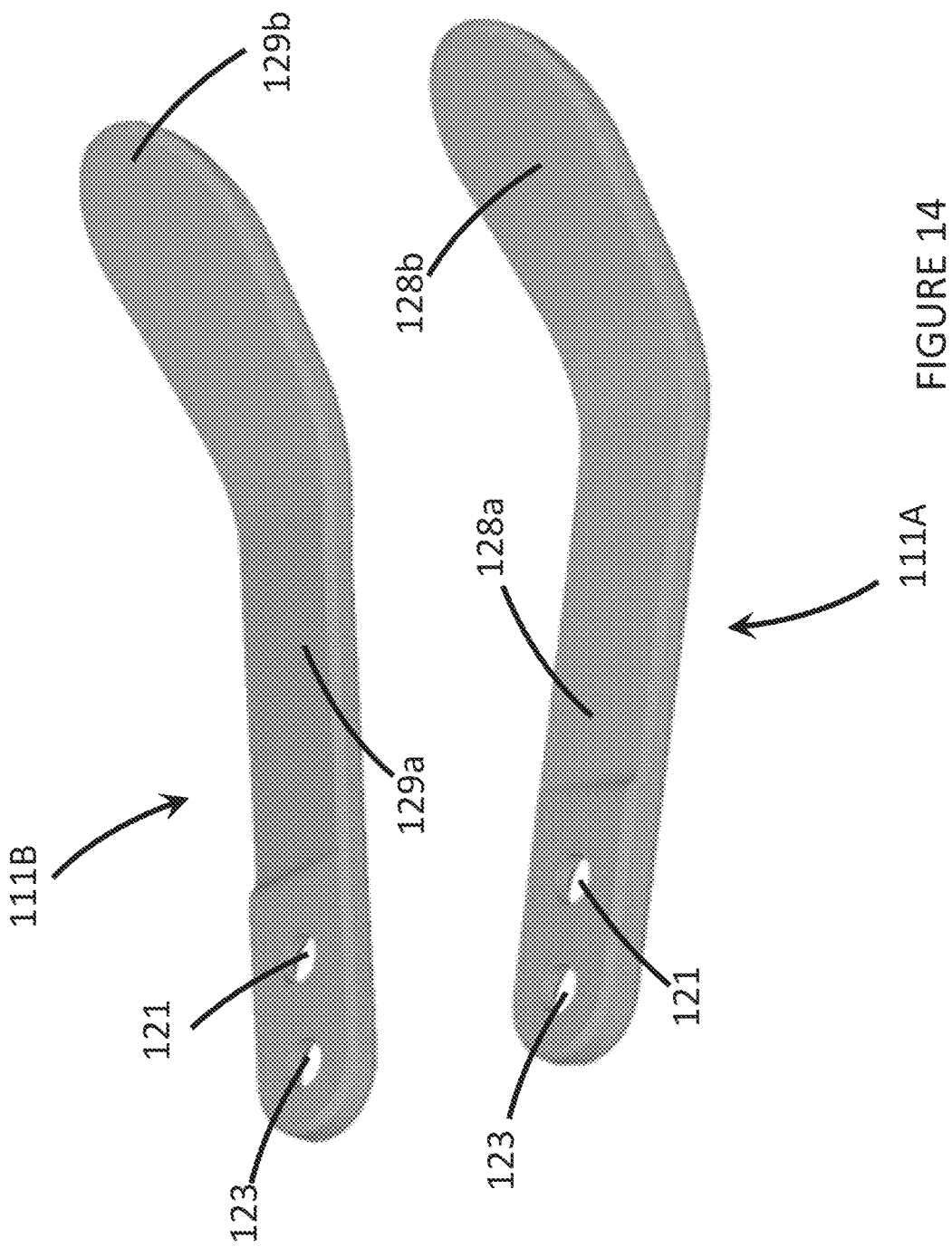
FIG. 14 is a perspective view from above of the actuators of the games controller of FIG. 10.
Figure 15:
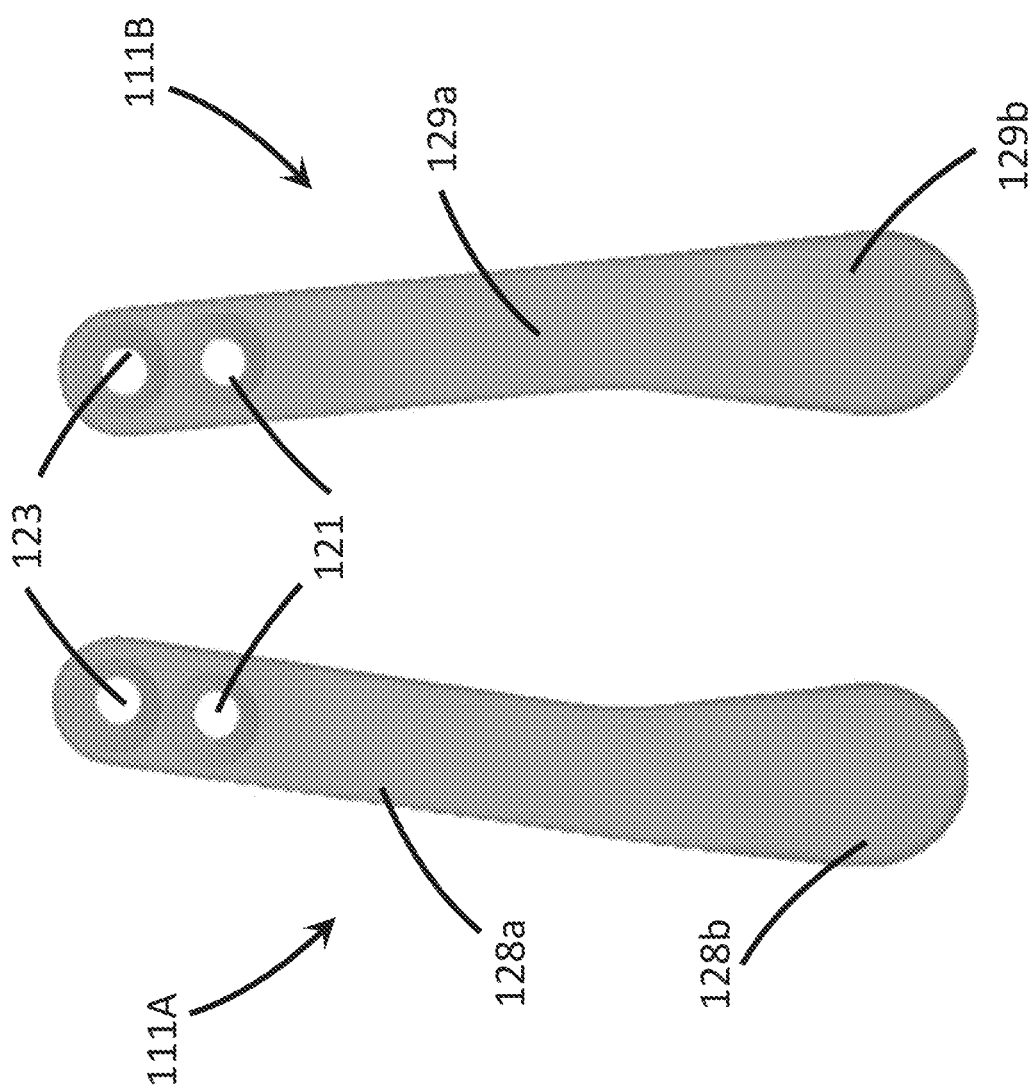
FIG. 15 is a plan view from below of the actuators of the games controller of FIG. 10.
Figure 16:
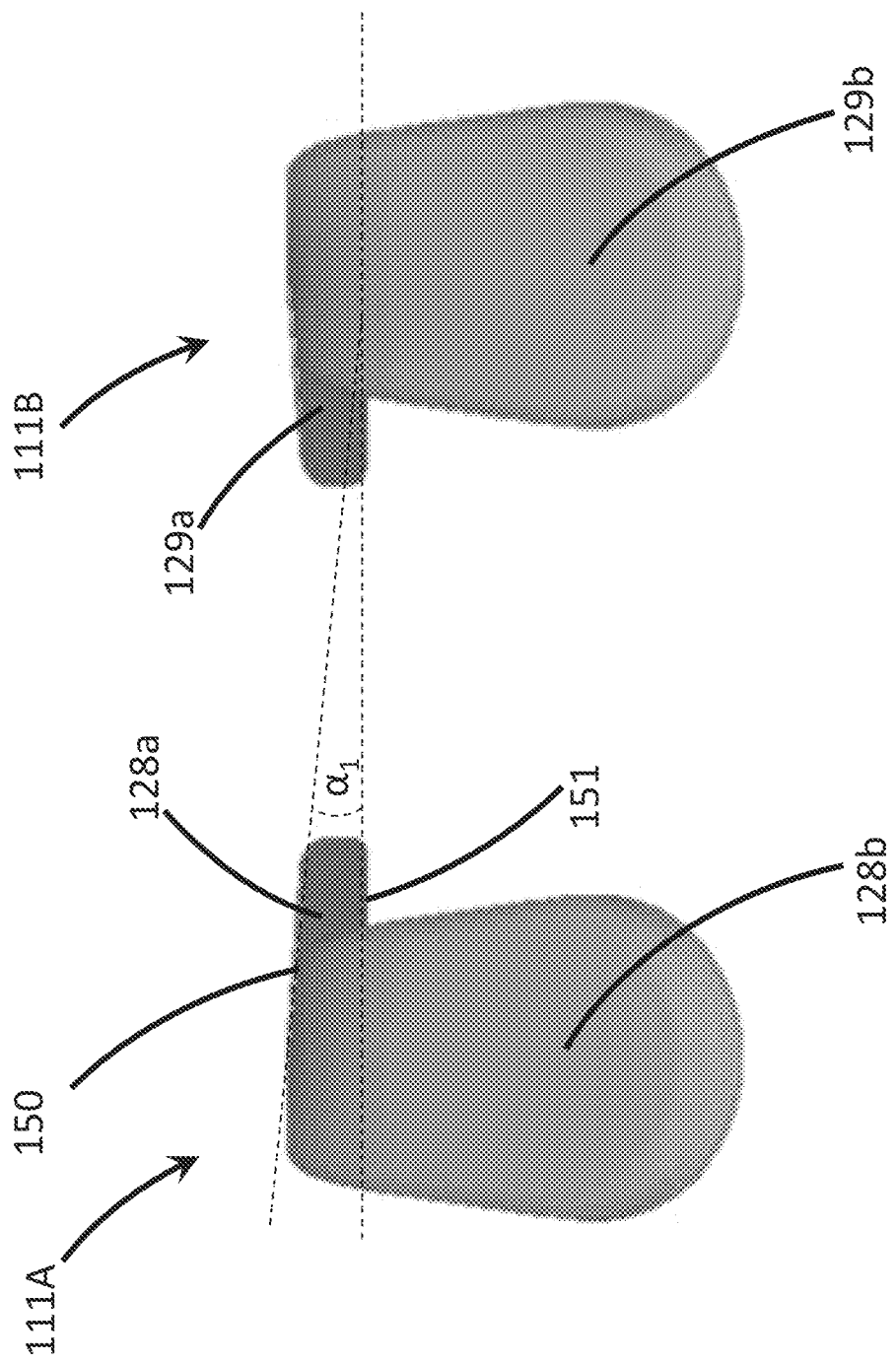
FIG. 16 is a first end view of the actuators of the games controller of FIG. 10.
Figure 17:
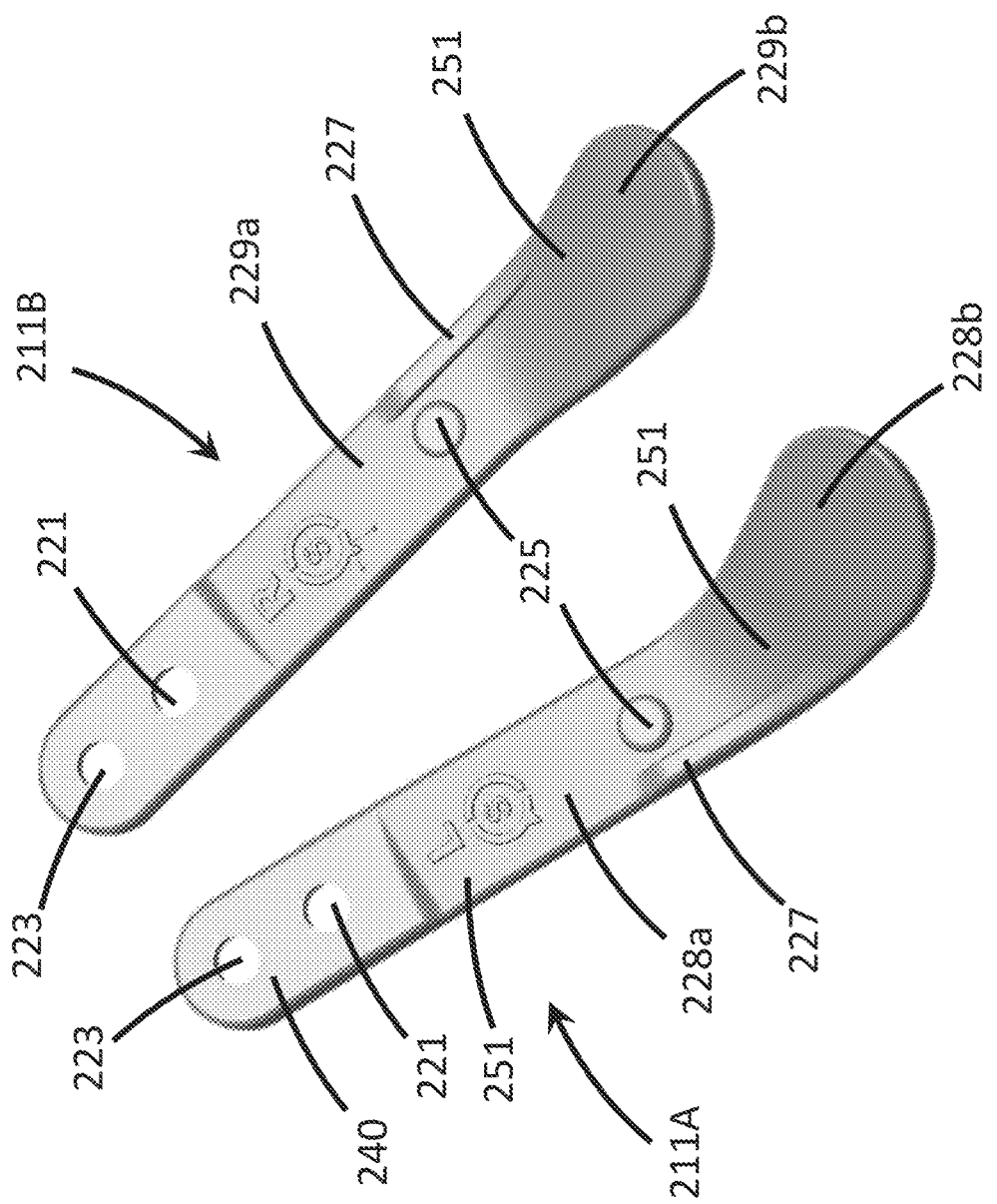
FIG. 17 is a perspective view from above of alternative actuators for the games controller of FIG. 10.

The outer surface 150—the outer surface 150 is an upper surface as illustrated in FIGS. 13 to 16, albeit in normal use of the controller 110 the outer surface 150 will be lowermost—of the first portion 128a, 129a of each paddle 111A, 111B is arranged to be non-parallel with at least a portion (a mounting portion comprising the apertures 121, 123, of the inner surface 151) of the inner surface 151—inner surface 151 is a lower surface as illustrated in FIGS. 13 to 16, albeit in normal use of the controller 110 the inner surface 151 will be uppermost—of the first portion 128a, 129a of the respective paddle 111A, 111B; this best illustrated in FIGS. 14 and 16. The outer surface 150 is orientated or inclined at an angle α1 with respect to the inner surface 151. The paddles 111A, 111B are inclined in a direction transverse to a longitudinal axis of the paddle 111A, 111B, such that an outer side edge of the outer surface 151 of the paddle 111A, 111B is at a different elevation to an inner side edge of the outer surface 151 of the paddle 111A, 111B. Preferably, the outer surface 150 of the paddle 111A, 111B is planar in nature so as to form a ramp, although in alternative embodiments the outer surface 150 may be non-planar, for example curved or arcuate.

The second portion 128b, 129b of the paddles 111A, 111B may be arranged such that the outer side edge is at a different elevation to an opposing inner side edge. That is to say, the second portion 128b, 129b is arranged to have a transverse inclination as well as a longitudinal inclination with respect to the portion of the inner surface 151 that forms the mounting surface of the paddle 111A, 111B for mounting the paddle 111A, 111B to the base of the controller 110.

The elongate shape of the paddles allows a user to engage the paddles with any of the middle, ring or little fingers; it also provides that different users, having different sized hands, can engage with the paddles in a comfortable position.

A user may engage the paddles 111A, 111B with the tips of the fingers, preferably the middle fingers, without compromising the user's grip on the controller 110. However, it is envisaged that a user could use the ring or little finger. The index fingers may simultaneously engage trigger style controls mounted on the forward end of the controller 110 whilst the thumbs may be used to activate controls on the top of the controller 110.

Each of the paddle levers 111A, 111B can replicate a function of one of the four buttons located on the top of the controller 110, and thereby allows a user to operate the functions of the relevant buttons using one of the fingers they employ to grasp the handles H1, H2 without the need to remove either of their thumbs from the left or right thumb sticks. In alternative embodiments, the paddle levers 111A, 111B may activate a new function not activated by the controls on the top of the controller 110.

The paddles 111A, 111B can be bent or deformed temporarily. The inherent resilience of the paddles 111A, 111B returns the paddles 111A, 111B substantially to their starting position when released, and allows the switch mechanism to do the same.

The screws 115 are received in the base of the controller 110 in a respective aperture 121, 123 having an internal screw thread. It is envisaged that the internal screw thread may be pre-tapped into the base portion of the controller body, or may be created when driving the screws 115 into the base portion of the controller body, for example by using a self-tapping screw 115. It is also envisaged that the internal screw thread may be provided directly in the material forming the base portion of the controller body or may be provided in a separate insert or nut secured to, or in, the controller body. In alternative embodiments other fixing means are envisaged, for example the paddles 111A, 111B may be bonded or adhesively secured to the controller body; in other embodiments the paddles 111A, 111B may comprise an integrally formed clip or locking device such as a detent or barb for being engaged with a receiver located on the controller body. In still further embodiments, the paddles 111A, 111B may be integrally formed with a cover panel or portion of the base panel of the controller such as, but not limited to, a battery hatch.

Optionally, the base of the controller 110 is provided with two channels molded into the base of the controller 110. Each channel receives a portion of a respective one of the paddles 111A, 111B. In the illustrated embodiment the channels are arranged to receive an end portion of the respective paddle 111A, 111B, which end portion includes the fixed end. This is achieved by reducing the depth of the channels towards one end thereof to nothing, such that the channel walls are tapered. This provides that one end, the moveable end, of each of the paddles 111A, 111B stands proud of the base of the controller 10. In this way, a user can readily engage with the paddles 111A, 111B. The channels provide stability to the paddles 111A, 111B. This increases the durability of the paddles and of the fixing means. An existing controller may be retrofitted with the channels by removing an existing base panel or chassis member and substituting a replacement base panel or chassis member having channels integrally molded therein.

The channels reduce the likelihood of the paddles 111A, 111B rotating about the fixing end when engaging with the moveable end. The channels serve to restrict movement of the paddles 111A, 111B in a direction substantially perpendicular to the base of the controller.

Referring now to FIGS. 17 to 20B, there are shown alternative actuators or paddles 211A, 211B. The alternative paddles 211A, 211B can be employed with the controller 110 shown in FIGS. 10 to 12 in replacement of the paddles 111A, 111B shown in FIGS. 13 to 16.

The paddles 211A, 211B are arranged so as to be wider at the free end than at the fixed end. Preferably, an inner side edge of the second portion 228b, 229b is divergently arranged with respect to the outer side edge of the second portion 228b, 229b. The inner side edge of the second portion 228b, 229b is non-linear or orientated at an angle with respect to an inner side edge of the first portion 228a, 229a. The outer side edge of the second portion 228b, 229b is arranged to be collinear with the outer side edge of the first portion 228a, 229a.

Figure 18:
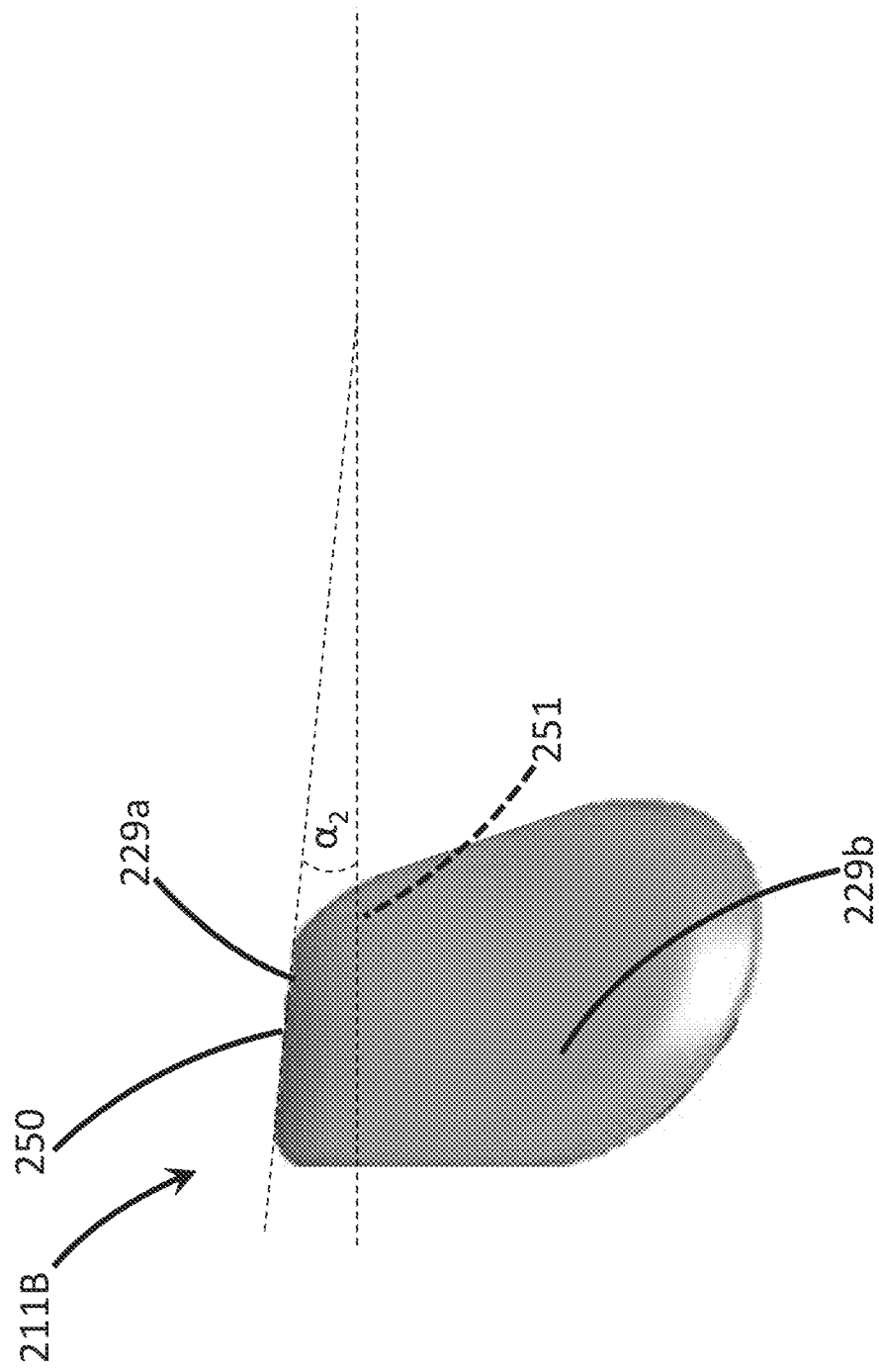
FIG. 18 is a first end view of one of the actuators of FIG. 17.
Figure 19:
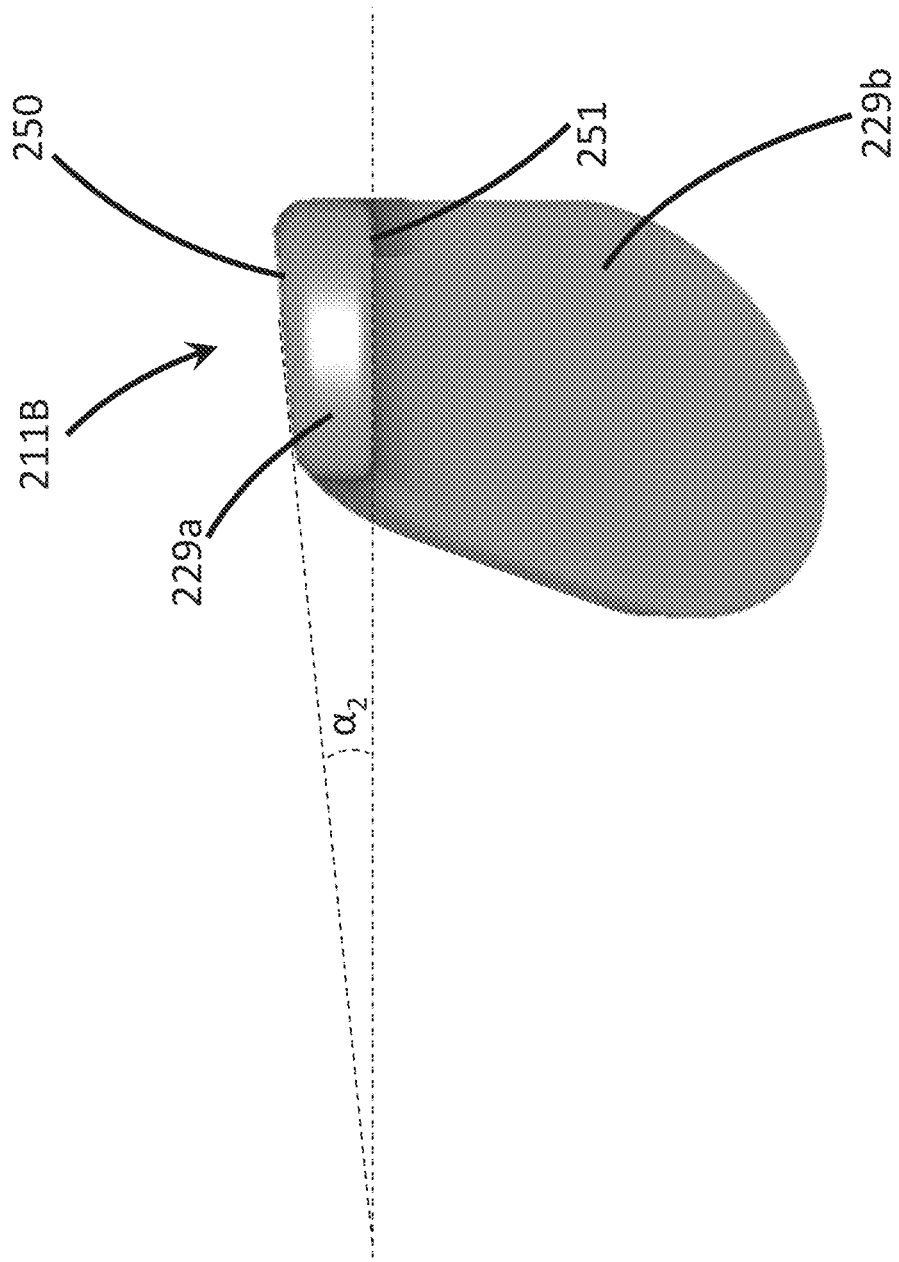
FIG. 19 is a second end view of the actuator of FIG. 18.

The outer surface 250—the outer surface 250 is the upper surface as illustrated in FIGS. 18 and 19, albeit in normal use of the controller 110 the outer surface 250 will be lower-most—of the first portion 228a, 229a of each paddle 211A, 211B is arranged to be non-parallel with at least a portion (a mounting portion 240 comprising the apertures 221, 223) of the inner surface 251—the inner surface 251 is a lower surface as illustrated in FIGS. 18 and 19, albeit in normal use of the controller 110 the outer surface 251 will be uppermost—of the first portion 228a, 229a of the respective paddle 211A, 211B; this best illustrated in FIGS. 18 and 19. The outer surface 250 is orientated or inclined at an angle $\alpha_2$ with respect to the inner surface 251. The paddles 211A, 211B are inclined in a direction transverse to a longitudinal axis of the paddle 211A, 211B, such that an outer side edge of the outer surface 250 of the paddle 211A, 211B is at a different elevation to an inner side edge of the outer surface 250 of the paddle 211A. 211B. Preferably, the outer surface 250 of the paddle 211A, 211B is planar in nature so as to form a ramp, although in alternative embodiments, the outer surface 250 may be non-planar, for example curved or arcuate.

The second portion 228b, 229b of the paddles 211A, 211B may be arranged such that the outer side edge is at a different elevation to an opposing inner side edge. That is to say the second portion 228b, 229b is arranged to have a transverse inclination, as indicated in FIGS. 20A, 20B by angles $\alpha_3$, $\alpha_4$ respectively, as well as a longitudinal inclination with respect to the portion of the inner surface 251 which forms the mounting surface of the paddle 211A, 211B for mounting the paddle 211A, 211B to the base of the controller 110.

The paddles 211A, 211B comprise a raised protrusion 225 extending from the inner surface 251. The protrusion is optionally circular in shape and comprises a flat plateau. The plateau is arranged to be disposed in close proximity to a surface of a micro-switch such as the button of a Tact switch. Preferably, the plateau forms a contact surface which is in touching contact with the micro-switch, such that a force applied to the outer surface 250 of the paddle 211A, 211B immediately effects actuation of the micro-switch. In this way, there is no free play between the paddle 211A, 211B and the micro-switch.

The paddles 211A, 211B comprise a ridge or rib 227 extending longitudinally along a portion of the inner surface 251. Optionally, each rib 227 is disposed proximate an outer edge of each of a respective paddle 211A, 211B. The rib 227 is formed in part on the inner surface 251 of the first portion 228a, 229a and in part on the inner surface 251 of the second portion 228b, 229b. In this way, the rib 227 extends across the bend or junction between the first portion 228a, 229a and the second portion 228b, 229b. The ribs 227 serve to provide strength to the paddles 211A, 211B. In this way, the ribs 227 provide a localized increase in rigidity to the paddles 211A, 211B, such that when a force is applied to the outer surface 250 of the second portion 228b, 229b the rib 227 prevents or reduces the likelihood of the second portion 228b, 229b bending with respect to the first portion 228a, 229a. Thus when a force is applied to the outer surface 250 of the second portion 228b, 229b the rib 227 serves to transfer the force into the first portion 228a, 229a so as to effect a deformation or bending of the paddle 211A, 211B in first portion 228a, 229a. This ensures the protrusion 225 (or other portion of the inner surface 251) of the first portion acts upon the micro-switch to effect actuation thereof.

It is envisaged that the controllers may be coupled to a games console or computer by a wired connection or by a wireless connection device.

It will be recognized that as used herein, directional references such as "top", "bottom", "front", "back", "end". "side", "inner", "outer", "upper" and "lower" do not limit the respective features to such orientation, but merely serve to distinguish these features from one another.

What is claimed is:

1. An input device for supplying user inputs to a computer program, the input device comprising:
    a case shaped to be held in both hands of a user;
    a plurality of controls located on a front surface of the device and configured to be operated by the user's thumbs;
    a back control located at a back surface of the device opposite the front surface, the back control comprising:
        a member sized and shaped to be operated by a middle, ring, or pinkie finger of the user, the member comprising a first portion disposed parallel to the back surface of the device and a second portion disposed parallel to a second surface of the device, wherein the second surface of the device is disposed at an angle to the back surface;
        an activation surface formed on the second surface, the activation surface configured to be activated by a middle, ring, or pinkie finger of the user, and
        a mounting portion spaced apart from the activation surface, the mounting portion configured to affix the member to the input device,
        wherein the member is configured to displace towards the device in response to a touch force applied to the activation surface of the member to translate the touch force into an actuation force applied by the member to a sensor of the input device.

2. The input device of claim 1, wherein the second surface comprises a bottom end of the input device.

3. The input device of claim 2, wherein the back control further comprises:
    a second member sized and shaped to be operated by a middle, ring, or pinkie finger of the user, the second member comprising a first portion disposed parallel to the back surface of the device and a second portion disposed parallel to the bottom end of the device;
    a second activation surface formed on the second surface, the second activation surface configured to be activated by a middle, ring, or pinkie finger of the user, and
    a second mounting portion spaced apart from the second activation surface, the second mounting interface configured to affix the second member to the input device, wherein the second member is configured to displace towards the device in response to a second touch force applied to the second activation surface of the second member to translate the second touch force into a second actuation force applied by the member to a second sensor of the input device.

4. The input device of claim 2, wherein the input device if configured with a top end opposite the bottom end, the top end including a second plurality of controls configured to be operated by the user's index fingers.

5. The input device of claim 1, wherein at least a portion of the member is configured and arranged to be inclined in a longitudinal direction with respect to the mounting portion.

6. The input device of claim 1, wherein the sensor comprises a switch.

7. The input device of claim 6 wherein the switch is located within the case.

8. The input device of claim 7, wherein at least a portion of the switch extends outside of the case.

9. The input device of claim 1, wherein the input device comprises a game controller.

10. A control accessory for a game controller, the control accessory comprising:
a member sized and shaped for manipulation by a middle, ring, or pinkie finger of a user, the member including a first portion, a second portion, and a bend between the first portion and the second portion that is angled to follow a contour of a case of the game controller;
an activation portion formed on the second portion, the activation portion configured to be activated by a middle, ring, or pinkie finger of the user; and
a mounting interface located on the first portion of the member spaced apart from the activation portion, the mounting interface configured to rigidly couple the control accessory to the game controller,
wherein, with the control accessory coupled to the game controller,
the first portion of the member is configured to be disposed parallel and proximate to a first surface of a case of the game controller;
the second portion of the member is configured to be disposed parallel and proximate to a second surface of the case, the second surface of the case disposed at an angle relative to the first surface of the case; and
the member is configured, in response to a touch force applied to the activation portion of the member, to displace in a direction towards the game controller to translate the touch force into an actuation force applied by the member to a sensor of the game controller.

11. The control accessory of claim 10, wherein:
the first surface of the case forms at least a portion of a back of the game controller.

12. The control accessory of claim 11, wherein:
the second surface of the case forms at least a portion of a bottom of the game controller; and the contour of the case comprises an intersection of the back of the game controller and the bottom of the game controller disposed at an angle to the back.

13. The control accessory of claim 12, wherein the bottom of the game controller is opposite a top of the game controller, the top of the game controller configured with a plurality of controls configured to be operated by an index finger of the user.

14. The control accessory of claim 10, wherein at least a portion of the member is configured and arranged to be inclined in a longitudinal direction with respect to the mounting interface.

15. The control accessory of claim 10, wherein the sensor comprises a switch.

16. The control accessory of claim 15, wherein the switch is located within the case of the game controller.

17. The control accessory of claim 16, wherein at least a portion of the switch extends outside of the case.

18. A game controller comprising:
a case shaped to be held in both hands of a user without the need for additional support, the case comprising a front surface, a back surface opposite the front surface, a top surface disposed between the front surface and the back surface, and an additional surface disposed at an angle to the back surface;
a plurality of front controls located on the front surface of the case and configured to be operated by the user's thumbs;
a plurality of top controls located on the top surface of the case and configured to be operated by the user's index fingers;
a back control located at the back surface of the game controller; and
a sensor in communication with the back control,
wherein the back control comprises:
a member sized and shaped to be operated by a middle, ring, or pinkie finger of the user, the member comprising a first portion disposed parallel and proximate to the back surface of the case and a second portion disposed parallel and proximate to the additional surface of the case;
an activation surface formed on the second portion of the member, the activation surface configured to be activated by the middle, ring, or pinkie finger of the user, and
a mounting portion disposed on the first portion of the member, the mounting portion configured to affix the member to the game controller,
wherein the member is configured to displace towards the game controller in response to a touch force applied to the activation surface of the member to translate the touch force into an actuation force applied by the member to the sensor of.

19. The game controller of claim 18, wherein the additional surface comprises a bottom end of the game controller.

20. The game controller of claim 19, wherein at least a portion of the sensor extends outside of the case.

* * * * *